United States Patent
Nam et al.

(10) Patent No.: US 11,324,042 B2
(45) Date of Patent: May 3, 2022

(54) PERFORMING A LISTEN-BEFORE-TALK (LBT) PROCEDURE FOR SYNCHRONIZATION SIGNAL AND PHYSICAL BROADCAST CHANNEL (PBCH) BLOCK (SSB)

(71) Applicant: QUALCOMM Incorporated, San Diego, CA (US)

(72) Inventors: Wooseok Nam, San Diego, CA (US); Arumugam Chendamarai Kannan, San Diego, CA (US); Tao Luo, San Diego, CA (US); Xiaoxia Zhang, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 13 days.

(21) Appl. No.: 16/746,664

(22) Filed: Jan. 17, 2020

(65) Prior Publication Data

US 2020/0236711 A1    Jul. 23, 2020

Related U.S. Application Data

(60) Provisional application No. 62/794,837, filed on Jan. 21, 2019.

(51) Int. Cl.
*H04W 74/08* (2009.01)
*H04W 56/00* (2009.01)

(52) U.S. Cl.
CPC ... *H04W 74/0808* (2013.01); *H04W 56/0015* (2013.01); *H04W 74/0891* (2013.01)

(58) Field of Classification Search
None
See application file for complete search history.

(56) References Cited

U.S. PATENT DOCUMENTS

| | | | | |
|---|---|---|---|---|
| 2018/0115996 A1* | 4/2018 | Si | | H04W 74/0808 |
| 2019/0387546 A1* | 12/2019 | Li | | H04W 74/0833 |
| 2020/0053781 A1* | 2/2020 | Pan | | H04J 11/0069 |
| 2021/0051683 A1* | 2/2021 | Li | | H04W 74/0808 |

OTHER PUBLICATIONS

International Search Report and Written Opinion—PCT/US2020/014275—ISA/EPO—dated Apr. 21, 2020.

(Continued)

*Primary Examiner* — Jutai Kao
(74) *Attorney, Agent, or Firm* — Harrity & Harrity, LLP

(57) ABSTRACT

Various aspects of the present disclosure generally relate to wireless communication. In some aspects, a first wireless node may perform a listen-before-talk (LBT) procedure with a directional coverage that is based at least in part on a directional coverage of a set of synchronization signal and physical broadcast channel (PBCH) blocks (SSBs) of a synchronization signal (SS) burst set to be transmitted by the base station. The first wireless node may transmit, to one or more second wireless nodes, the set of SSBs based at least in part on a successful result of the LBT procedure. Numerous other aspects are provided.

30 Claims, 16 Drawing Sheets

(56) References Cited

OTHER PUBLICATIONS

NTT DOCOMO, et al., "Channel Access Procedures for NR-U operation", 3GPP Draft, 3GPP TSG-RAN WG2 Meeting #103, R1-1813313, Channel Access Procedures for NR-U Operation, 3rd Generation Partnership Project (3GPP), Mobile Competence Centre, 650, Route Des Lucioles, F-06921 Sophia-Antipolis Cedex, vol. RAN WG1. No. Spokane, USA, Nov. 12, 2018-Nov. 16, 2018, Nov. 11, 2018 (Nov. 11, 2018), XP051555340, 5 pages, Retrieved from the Internet: URL: http://www.3gpp.org/ftp/Meetings%5F3GPP%5FSYNC/RAN1/Docs/R1%2D1813313%2Ezip. [retrieved on Nov. 11, 2018].

OPPO: "Channel Access Mechanisms on NR-U", 3GPP Draft, 3GPP TSG RAN WG1 Meeting #93, R1-1806852, 3rd Generation Partnership Project (3GPP), Mobile Competence Centre, 650, Route Des Lucioles, F-06921 Sophia-Antipolis Cedex, France, vol. RAN WG1. No. Busan, Korea, May 21, 2018-May 25, 2018, May 12, 2018 (May 12, 2018), XP051462789, 2 pages, Retrieved from the Internet: URL: http://www.3gpp.org/ftp/tsg%5Fran/WG1%5FRL1/TSGR1%5F93/Docs. [retrieved on May 12, 2018] Section 2.1 Section 3.

Potevio., "Discussion on Enhancement to DRS Transmission for NR-U", 3GPP Draft, 3GPP TSG RAN WG1 Ad-Hoc Meeting 1901, R1-1901149, 3rd Generation Partnership Project (3GPP), Mobile Competence Centre, 650, Route Des Lucioles, F-06921 Sophia-Antipolis Cedex, France, vol. RAN WG1. No. Taipei, Jan. 21, 2019-Jan. 25, 2019, Jan. 20, 2019 (Jan. 20, 2019), XP051593993, 4 pages, Retrieved from the Internet: URL: http://www.3gpp.org/ftp/Meetings%5F3GPP%5FSYNC/RAN1/Docs/R1%2D1901149%2Ezip. [retrieved on Jan. 20, 2019], Section 2, figures 1.2.

Samsung: "Channel Access Procedures for NR-U", 3GPP Draft, 3GPP TSG-RAN WG1 Meeting #95, R1-1812977, Channel Access Procedures for NR-U, 3rd Generation Partnership Project (3GPP), Mobile Competence Centre, 650, Route Des Lucioles, F-06921 Sophia-Antipolis Cedex, France, vol. RAN WG1. No. Spokane, USA, Nov. 12, 2018-Nov. 16, 2018, Nov. 11, 2018 (Nov. 11, 2018), XP051554956, 9 pages, Retrieved from the Internet: URL: http://www.3gpp.org/ftp/Meetings%5F3GPP%5FSYNC/RAN1/Docs/R1%2D1812977%2Ezip. [retrieved on Nov. 11, 2018].

ZTE, et al., "Discussion on Enhancement of Initial Access Procedures for NR-U", 3GPP Draft, R1-1900101, 3GPP TSG RAN WG1 Ad-Hoc Meeting 1901, Discussion on Enhancement of Initial Access Procedures for NR-U, 3rd Generation Partnership Project (3GPP), Mobile Competence Centre, 650, Route Des Lucioles, F-06921 Sophia, vol. RAN WG1. No. Taipei, Jan. 21, 2019-Jan. 25, 2019, Jan. 20, 2019 (Jan. 20, 2019), XP051593027, 11 pages, Retrieved from the Internet: URL: http://www.3gpp.org/ftp/Meetings%5F3GPP%5FSYNC/RAN1/Docs/R1%2D1900101%2Ezip. [retrieved on Jan. 20, 2018].

* cited by examiner

PERFORMING A LISTEN-BEFORE-TALK (LBT) PROCEDURE FOR SYNCHRONIZATION SIGNAL AND PHYSICAL BROADCAST CHANNEL (PBCH) BLOCK (SSB)

CROSS-REFERENCE TO RELATED APPLICATION

This Patent Application claims priority to U.S. Provisional Patent Application No. 62/794,837, filed on Jan. 21, 2019, entitled "PERFORMING A LISTEN-BEFORE-TALK (LBT) PROCEDURE FOR SYNCHRONIZATION SIGNAL AND PHYSICAL BROADCAST CHANNEL (PBCH) BLOCK (SSB)," and assigned to the assignee hereof. The disclosure of the above-mentioned U.S. Provisional Application is considered part of and is incorporated by reference in this patent application as if fully set forth below in its entirety and for all applicable purposes.

TECHNICAL FIELD

Aspects of the technology described below generally relate to wireless communication, and to techniques and apparatuses for performing a listen-before-talk (LBT) procedure for synchronization signal and physical broadcast channel (PBCH) block (SSB). Some techniques and apparatuses described herein enable and provide wireless communication devices and systems configured for improved communications, diverse spectrum scenarios (e.g., unlicensed/licensed), and directional beamforming for discovery/synchronization signal communications.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) (e.g., via downlink and uplink transmissions). The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

Multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). As demand for mobile broadband access continues to increase, there exists a need for further improvements in LTE and NR technologies. These improvements can apply to other multiple access technologies and the telecommunication standards that employ these technologies.

BRIEF SUMMARY OF SOME EXAMPLES

In some aspects, a method of wireless communication, performed by a first wireless node, may include performing a listen-before-talk (LBT) procedure. The LBT procedure can be performed for a set of synchronization signal and physical broadcast channel (PBCH) blocks (SSBs). The SSBs may be part of a synchronization signal (SS) burst set. The LBT procedure may consider one or more directions (e.g., related to unlicensed mmWave band transmissions via beamformed transmissions). A directional coverage of the LBT procedure can be based at least in part on a directional coverage of the set of SSBs. The method may also include transmitting, to one or more second wireless nodes, the set of SSBs based at least in part on the LBT procedure (e.g., if the LBT procedure determines transmission across the medium can occur and/or the medium is clear).

In some aspects, a first wireless node for wireless communication may include memory and one or more processors operatively coupled to the memory. The memory and the one or more processors may be configured to perform an LBT procedure for a set of SSBs of an SS burst set, wherein a directional coverage of the LBT procedure is based at least in part on a directional coverage of the set of SSBs; and transmit, to one or more second wireless nodes, the set of SSBs based at least in part on a successful result of the LBT procedure.

In some aspects, a non-transitory computer-readable medium may store one or more instructions for wireless communication. The one or more instructions, when executed by one or more processors of a first wireless node, may cause the one or more processors to perform an LBT procedure for a set of SSBs of an SS burst set, wherein a directional coverage of the LBT procedure is based at least in part on a directional coverage of the set of SSBs; and transmit, to one or more second wireless nodes, the set of SSBs based at least in part on a successful result of the LBT procedure.

In some aspects, a first apparatus for wireless communication may include means for performing an LBT procedure for a set of SSBs of an SS burst set, wherein a directional coverage of the LBT procedure is based at least in part on a directional coverage of the set of SSBs; and means for transmitting, to one or more second apparatuses, the set of SSBs based at least in part on a successful result of the LBT procedure.

In some aspects, a method of wireless communication, performed by a first wireless node, may include performing an LBT procedure with a directional coverage that is based at least in part on a directional coverage of a set of SSBs of a SS burst set to be transmitted by the base station; and transmitting, to one or more second wireless nodes, the set of SSBs based at least in part on a successful result of the LBT procedure.

In some aspects, a first wireless node for wireless communication may include memory and one or more processors operatively coupled to the memory. The memory and the one or more processors may be configured to perform an LBT procedure with a directional coverage that is based at least in part on a directional coverage of a set of SSBs of a SS burst set to be transmitted by the base station; and transmit, to one or more second wireless nodes, the set of SSBs based at least in part on a successful result of the LBT procedure.

In some aspects, a non-transitory computer-readable medium may store one or more instructions for wireless communication. The one or more instructions, when executed by one or more processors of a first wireless node, may cause the one or more processors to perform an LBT procedure with a directional coverage that is based at least in part on a directional coverage of a set of SSBs of a SS burst set to be transmitted by the base station; and transmit, to one or more second wireless nodes, the set of SSBs based at least in part on a successful result of the LBT procedure.

In some aspects, a first apparatus for wireless communication may include means for performing an LBT procedure with a directional coverage that is based at least in part on a directional coverage of a set of SSBs of a SS burst set to be transmitted by the base station; and means for transmitting, to one or more second wireless nodes, the set of SSBs based at least in part on a successful result of the LBT procedure.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description is provided herein, with some aspects of the disclosure being illustrated in the appended drawings. However, the appended drawings illustrate only some aspects of this disclosure and are therefore not to be considered limiting of the scope of the disclosure. The same reference numbers in different drawings may identify the same or similar elements.

DETAILED DESCRIPTION

Figure 1:
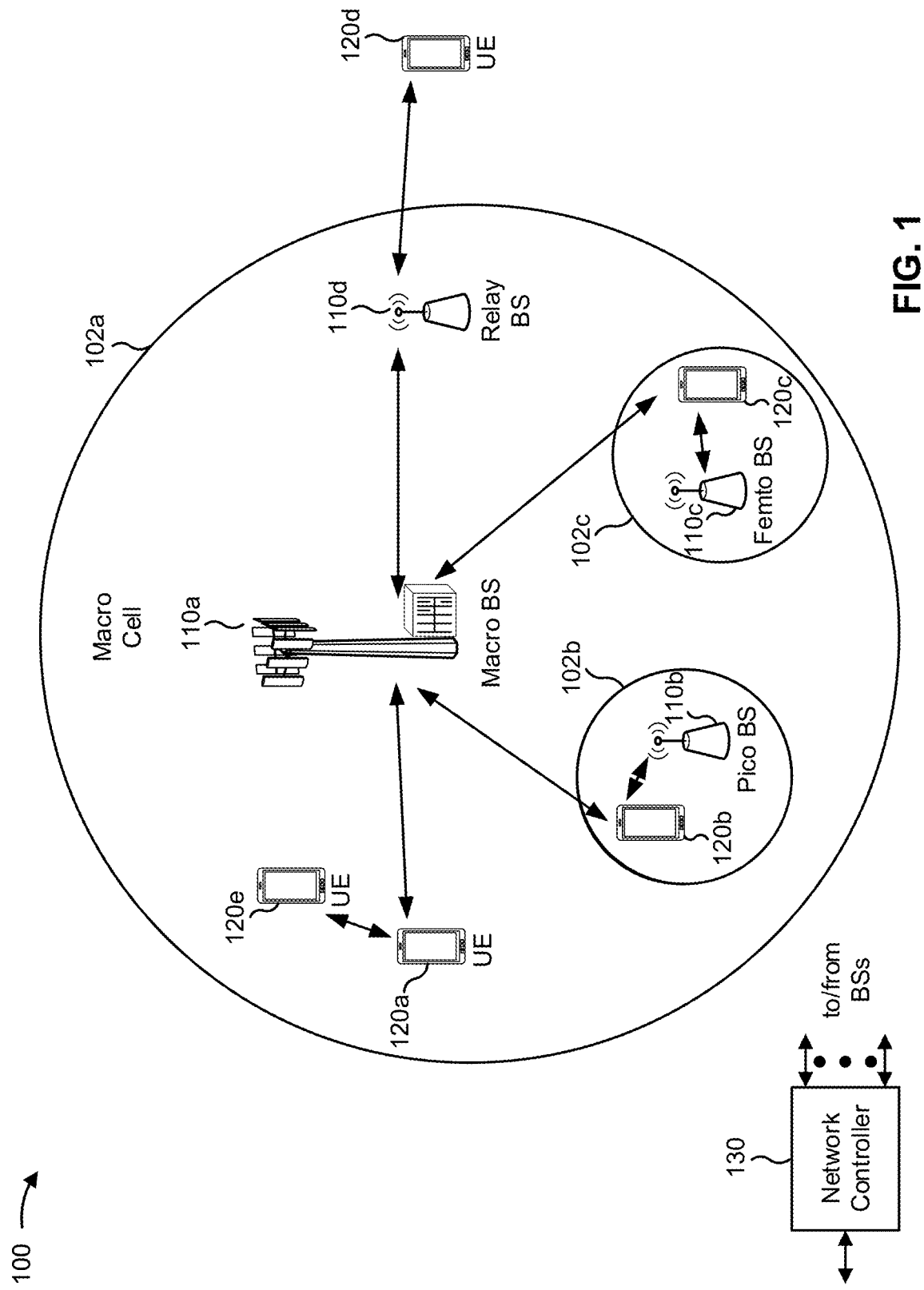
FIG. 1 is a block diagram conceptually illustrating an example of a wireless communication network, in accordance with various aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements" or "features"). These elements may be implemented using hardware, software, or combinations thereof. Whether such elements are implemented as hardware or software depends upon the particular application and design constraints imposed on the overall system.

While some aspects may be described herein using terminology commonly associated with 3G and/or 4G wireless technologies, aspects of the present disclosure can be applied in other generation-based communication systems, such as 5G and later, including NR technologies.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and/or other non-module-component based devices (e.g., end-user devices, vehicles, communication devices, computing devices, industrial equipment, retail/purchasing devices, medical devices, AI-enabled devices, and/or the like). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including one or more antennas, radio frequency chains, power amplifiers, modulators, buffers, processors, interleavers, adders/summers, and/or the like). It is intended that innovations described herein may be practiced in a wide variety of devices, chip-level components, systems, distributed arrangements, end-user devices, and/or the like of varying sizes, shapes, and constitution.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G Node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, robotics, drones, implantable devices, augmented reality devices, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples may differ from what is described with regard to FIG. 1.

Figure 2:
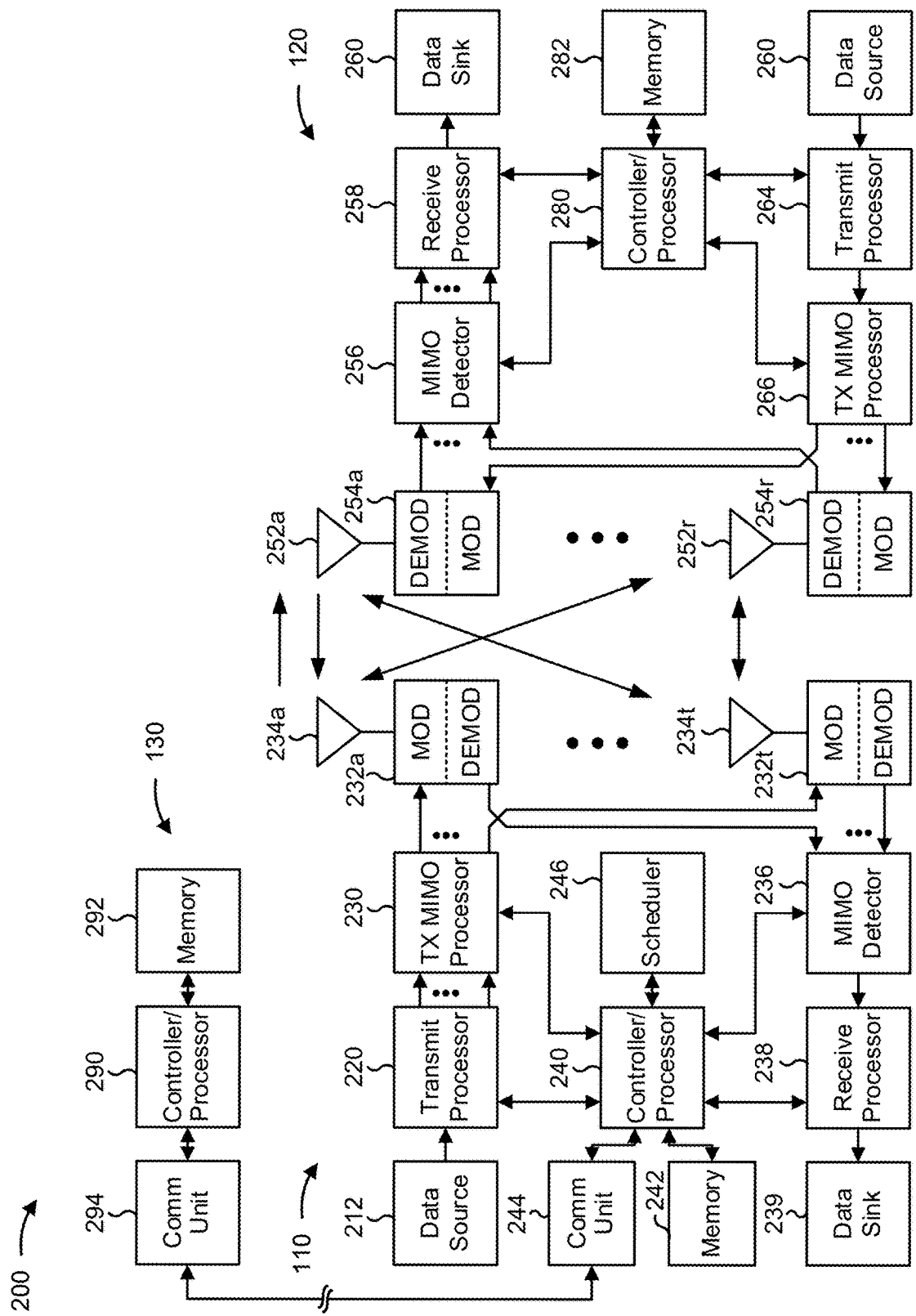
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234*a* through 234*t*, and UE 120 may be equipped with R antennas 252*a* through 252*r*, where in general T≥1 and R≥1.

At base station 110, a transmit processor 220 can carry out a number of functions associated with communications. For example, transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for orthogonal frequency division multiplexing (OFDM) and/or the like) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively. According to various aspects described in more detail below, the synchronization signals can be generated with location encoding to convey additional information.

At UE 120, antennas 252*a* through 252*r* may receive downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with performing a listen-before-talk (LBT) procedure for synchronization signal and physical broadcast channel (PBCH) block (SSB), as described in more detail elsewhere herein. For example, controller/processor 240 of base station 110, controller/processor 280 of UE 120, and/or any other component(s) of FIG. 2 may perform or direct operations of, for example, process 1200 of FIG. 12, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include various means for receiving transmissions. Received transmissions may include a set of synchronization signal and physical broadcast channel (PBCH) blocks (SSBs) of a synchronization signal (SS) burst set. The set of SSBs can be determined by base station 110 using a listen-before-talk (LBT) procedure. In some aspects, a directional coverage of the LBT procedure can be based at least in part on a directional coverage of the set of SSBs. The UE 120 may include means for performing channel discovery and/or synchronization based at least in part on the set of SSBs. In some aspects, the various means for carrying out one or more functions may include one or more components of UE 120 described in connection with FIG. 2. These structural components can include antenna 252, DEMOD 254, MOD 254, MIMO detector 256, receive processor 258, transmit processor 264, TX MIMO processor 266, controller/processor 280, and/or the like.

In some aspects, base station 110 may include means for performing a listen-before-talk (LBT) procedure. The LBT procedure can be carried out for a set of synchronization signal and physical broadcast channel (PBCH) blocks (SSBs) of a synchronization signal (SS) burst set. A directional coverage of the LBT procedure can be based at least in part on a directional coverage of the set of SSBs. The base station 110 may include means for transmitting, to one or more wireless nodes, the set of SSBs based at least in part on a successful result of the LBT procedure. In some aspects, the various means may include one or more components of base station 110 described in connection with FIG. 2. These structural components can include transmit processor 220, TX MIMO processor 230, DEMOD 232, MOD 232, antenna 234, MIMO detector 236, receive processor 238, controller/processor 240, and/or the like.

As indicated above, FIG. 2 is provided merely as an example. Other examples may differ from what is described with regard to FIG. 2. Further other figures and descriptive paragraphs illustrate and describe additional structural components capable of carrying out the various discussed means.

Figure 3A:
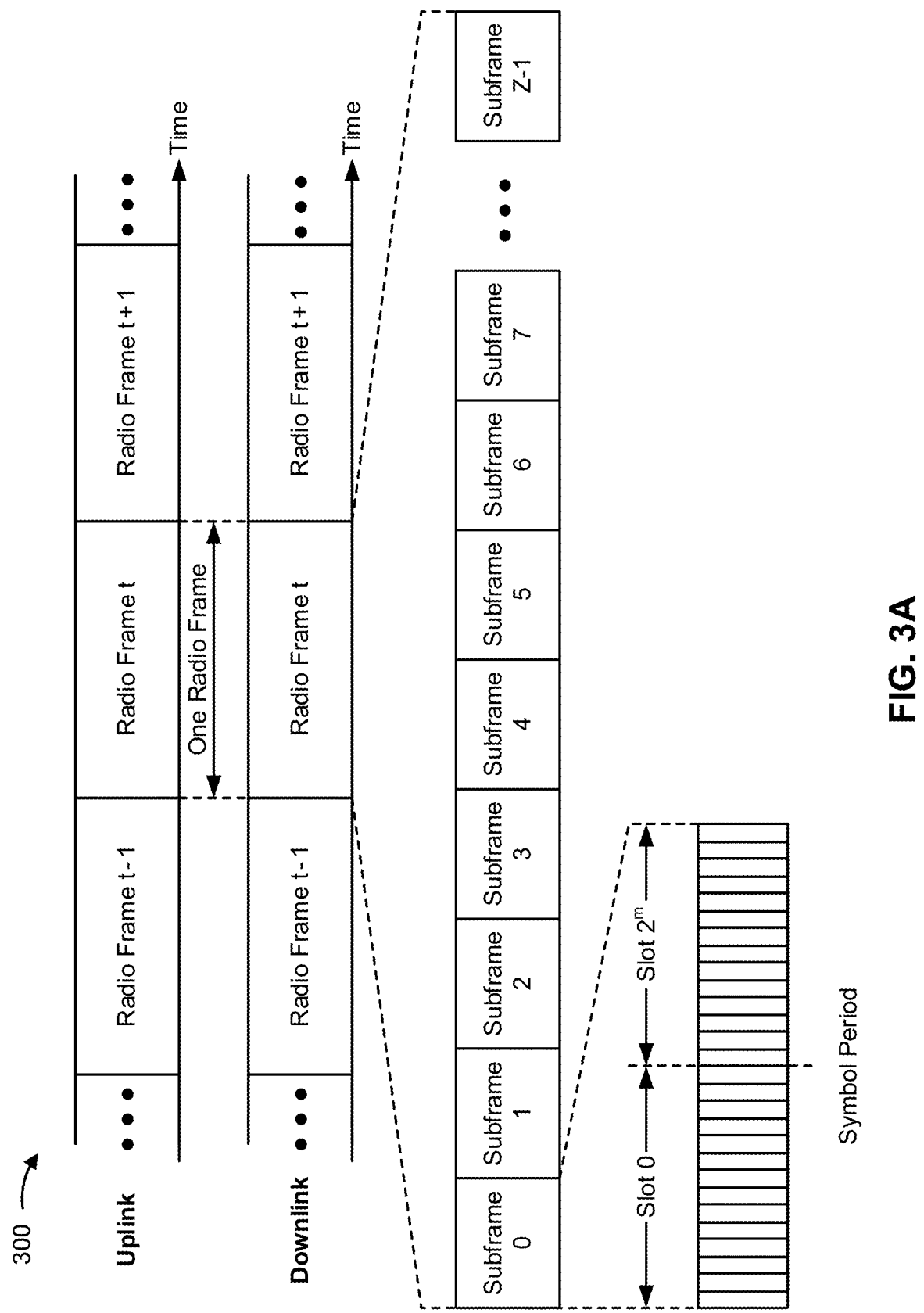
FIG. 3A is a block diagram conceptually illustrating an example of a frame structure in a wireless communication network, in accordance with various aspects of the present disclosure.

FIG. 3A shows an example frame structure 300 for frequency division duplexing (FDD) in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may frame-based, subframe-based, slot-based, symbol-based, and/or the like.

While some techniques are described herein in connection with frames, subframes, slots, and/or the like, these techniques may equally apply to other types of wireless communication structures. These structures may be referred to by using terms other than "frame," "subframe," "slot," and/or the like in 5G NR (e.g., protocol unit, protocol data unit, etc.). In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications systems (e.g., NR), a base station may transmit synchronization signals. For example, a base station may transmit a primary synchronization signal (PSS) and a secondary synchronization signal (SSS) on the downlink for each cell supported by the base station. The PSS and SSS may be used by UEs for cell search and acquisition. For example, the PSS may be used by UEs to determine symbol timing, and the SSS may be used by UEs to determine frame timing and a physical cell identifier associated with the base station. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
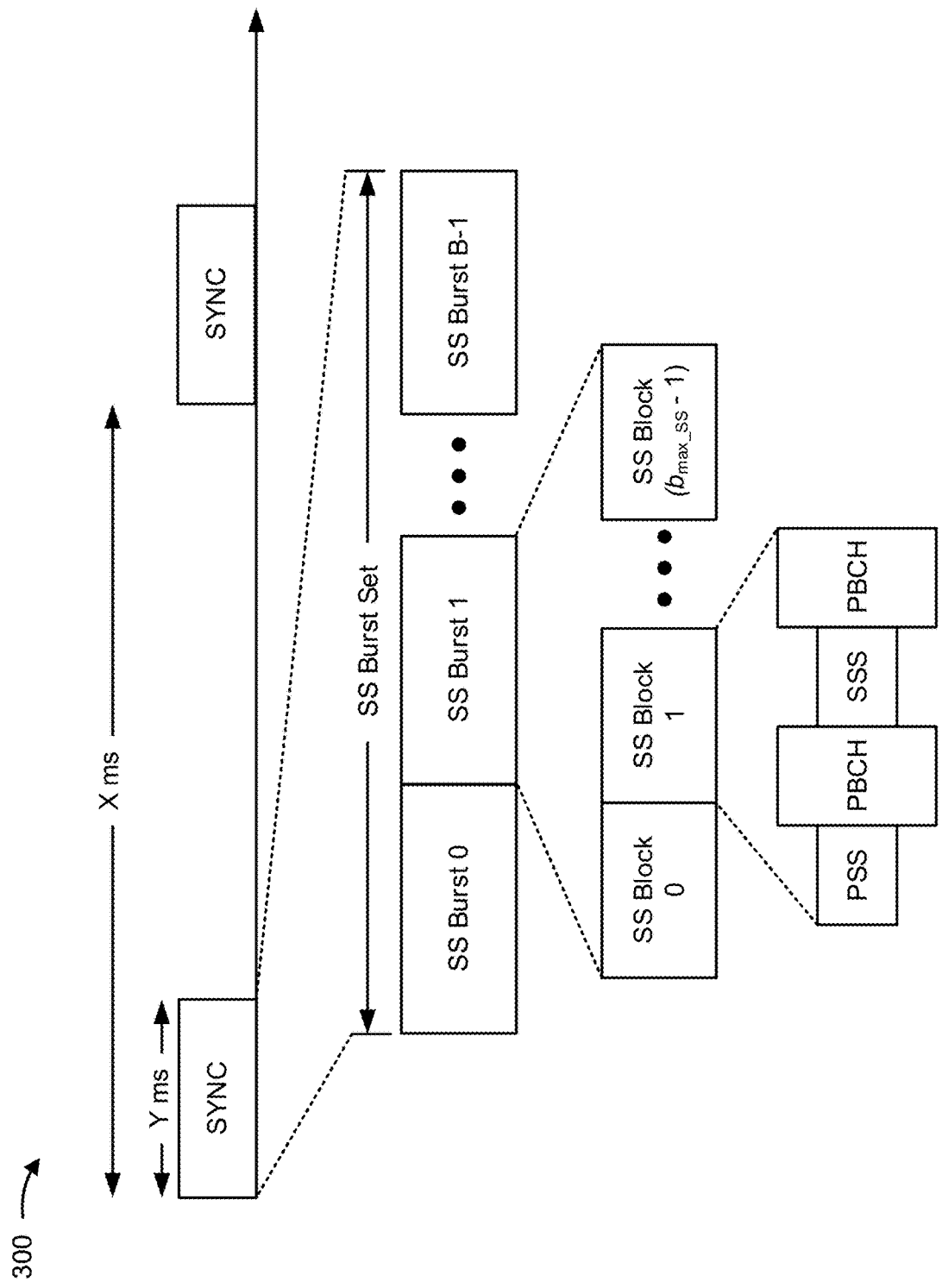
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy. This can be referred to as an example of a synchronization communication hierarchy. As shown in FIG. 3B, the SS hierarchy may include an SS burst set. In some aspects, an SS burst set may include a plurality of SS bursts (identified as SS burst 0 through SS burst B−1, where B is a maximum number of repetitions of the SS burst that may be transmitted by the base station). As further shown, each SS burst may include one or more SSBs (identified as SS block 0 through SS block ($b_{max\_SS}$−1), where $b_{max\_SS}$ is a maximum number of SSBs that can be carried by an SS burst). In some aspects, for example in millimeter wave systems, different SSBs may be beam-formed differently, for example, using different spatial filters or precoders to achieve transmission in different directions. In other words, different SSBs may be transmitted using beams that radiate in different directions. A plurality of SSBs of an SS burst or an SS burst set may be swept, for example, across the horizontal direction and/or the vertical direction so that UEs in different parts of a coverage area of the base station can identify a corresponding beam for communication with the base station. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry a variety of information and/or signals. For example in some aspects, an SS block can be configured to carry the PSS, the SSS, the PBCH, other synchronization signals (e.g., a tertiary synchronization signal (TSS)) and/or synchronization channels. One or more SS blocks can be used to carry information in variety of arrangements and/or formats. In some aspects for example, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

Symbols in an SS block can be arranged in various manners. In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

SS bursts may be arranged according to a variety of time-bounded or time-based arrangements. In some aspects, the SS bursts may have a burst period. The SS blocks of the SS burst may be transmitted by the base station according to the burst period. In other words, the SS blocks may be repeated during each SS burst. In some aspects, the SS burst set may have a burst set periodicity. The SS bursts of the SS burst set may be transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where C may be configurable for each slot. The base station may transmit traffic data and/or other data on the PDSCH in the remaining symbol periods of each slot.

As indicated above, FIGS. 3A and 3B are provided as examples. Other examples may differ from what is described with regard to FIGS. 3A and 3B.

Figure 4:
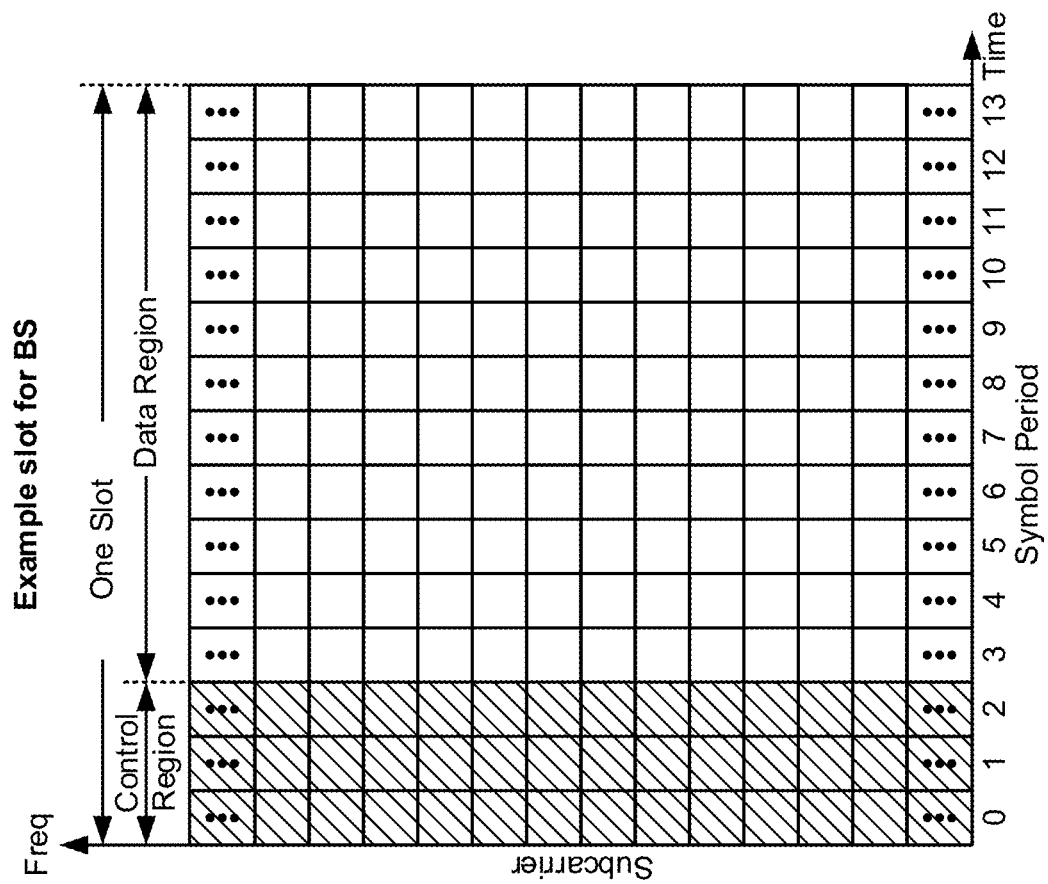
FIG. 4 is a block diagram conceptually illustrating an example slot format with a normal cyclic prefix, in accordance with various aspects of the present disclosure.

FIG. 4 shows an example slot format 410 with a normal cyclic prefix. The available time frequency resources may be partitioned into resource blocks. Each resource block may cover a set of subcarriers (e.g., 12 subcarriers) in one slot and may include a number of resource elements. Each resource element may cover one subcarrier in one symbol period (e.g., in time) and may be used to send one modulation symbol, which may be a real or complex value.

The slot format 410 may take on a variety of structures/formats. In some deployments, an interlace structure may be used. Interlacing can be used for one and/or each of the downlink and uplink. Further interlacing may be used for FDD in certain telecommunications systems (e.g., NR). For example, Q interlaces with indices of 0 through Q−1 may be defined, where Q may be equal to 4, 6, 8, 10, or some other value. Each interlace may include slots that are spaced apart by Q frames. In particular, interlace q may include slots q, q+Q, q+2Q, and/or the like, where q $\in \{0, \ldots, Q-1\}$.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-interference-and-noise ratio (SINR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New Radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

As indicated above, FIG. 4 is provided as an example. Other examples may differ from what is described with regard to FIG. 4.

Figure 5:
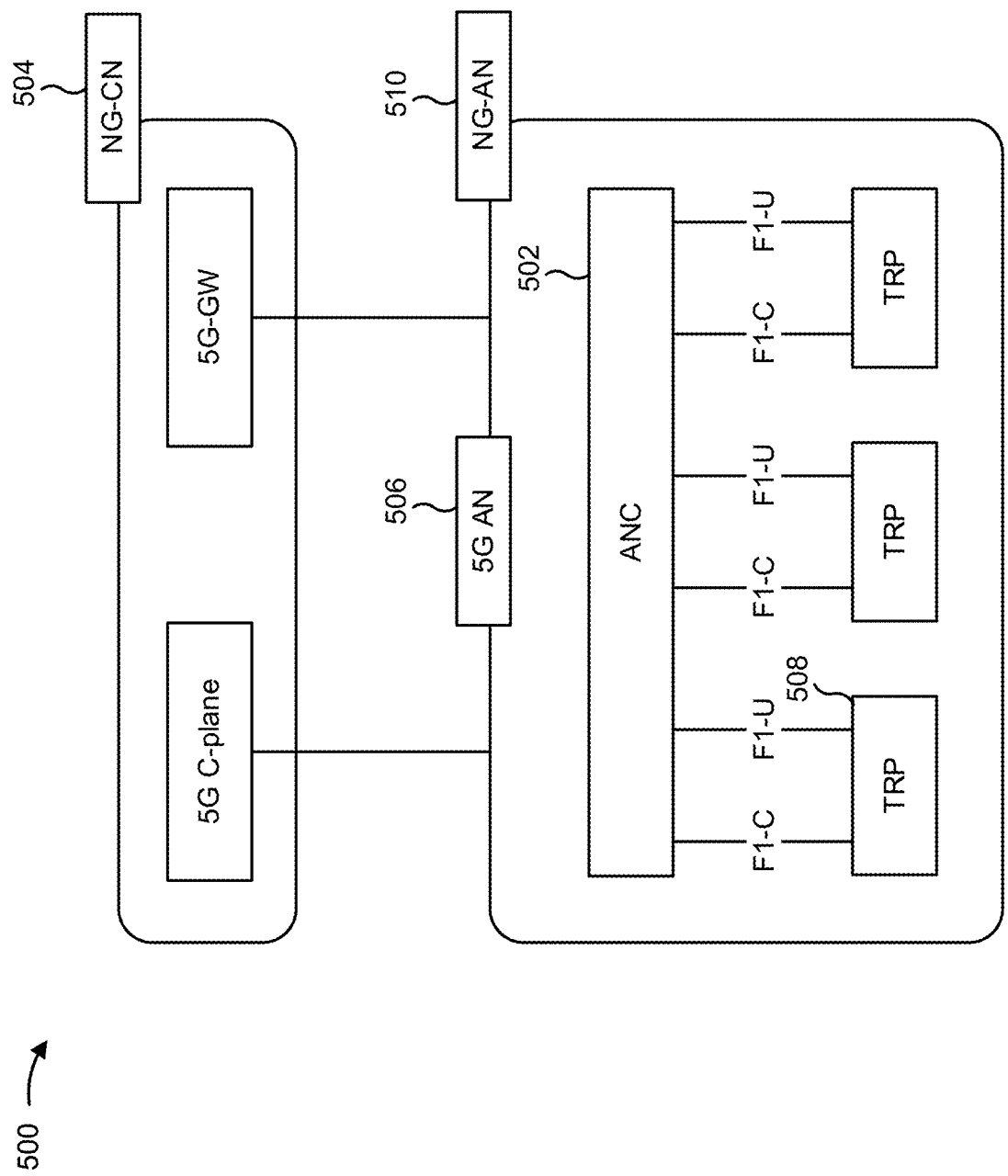
FIG. 5 illustrates an example logical architecture of a distributed radio access network (RAN), in accordance with various aspects of the present disclosure.

FIG. 5 illustrates an example logical architecture of a distributed RAN 500, according to aspects of the present disclosure. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) may terminate at the ANC. The ANC may include one or more TRPs 508 (which may also be referred to as BSs, NR BSs, Node Bs, 5G NBs, APs, gNB, or some other term). As described above, a TRP may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 500 may be used to illustrate fronthaul definition. The architecture may be defined that support fronthauling solutions across different deployment types. For example, the architecture may be based at least in part on transmit network capabilities (e.g., bandwidth, latency, and/or jitter).

In some deployments, the architecture of RAN 500 may share features and/or components with LTE. According to aspects, the next generation AN (NG-AN) 510 may support dual connectivity with NR. The NG-AN may share a common fronthaul for LTE and NR.

Also, in some deployments, the architecture of RAN 500 may enable cooperation between and among TRPs 508. For example, cooperation may be preset within a TRP and/or across TRPs via the ANC 502. According to aspects, no inter-TRP interface may be needed/present.

According to aspects, a dynamic configuration of split logical functions may be present within the architecture of RAN 500. The packet data convergence protocol (PDCP), radio link control (RLC), media access control (MAC) protocol may be adaptably placed at the ANC or TRP.

According to various aspects, a BS may include a central unit (CU) (e.g., ANC 502) and/or one or more distributed units (e.g., one or more TRPs 508).

As indicated above, FIG. 5 is provided merely as an example. Other examples may differ from what is described with regard to FIG. 5.

Figure 6:
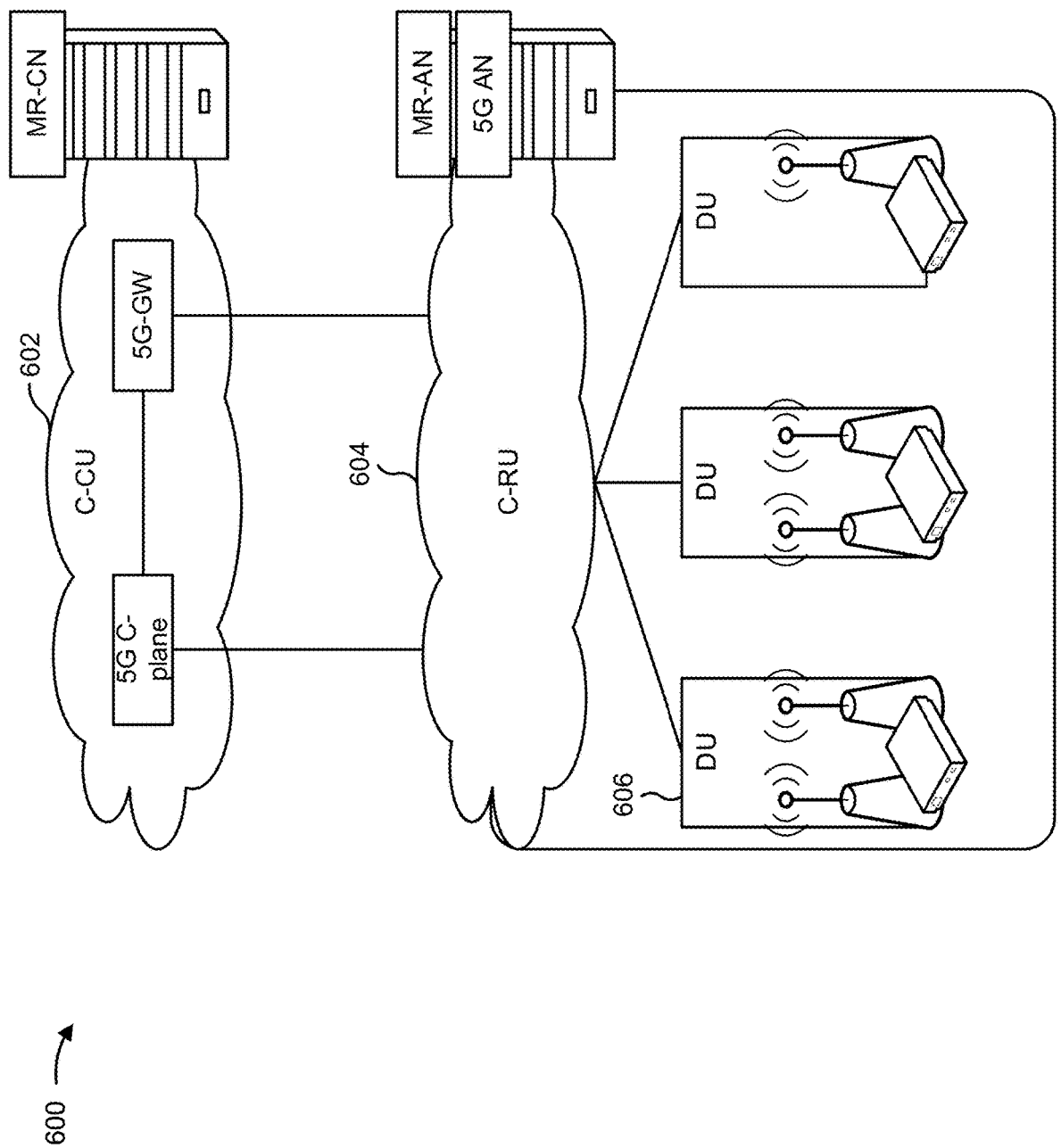
FIG. 6 illustrates an example physical architecture of a distributed RAN, in accordance with various aspects of the present disclosure.

FIG. 6 illustrates an example physical architecture of a distributed RAN 600, according to aspects of the present disclosure. A centralized core network unit (C-CU) 602 may host core network functions. The C-CU may be centrally deployed. C-CU functionality may be offloaded (e.g., to advanced wireless services (AWS)), in an effort to handle peak capacity.

A centralized RAN unit (C-RU) 604 may host one or more ANC functions. Optionally, the C-RU may host core network functions locally. The C-RU may have distributed deployment. The C-RU may be closer to the network edge.

A distributed unit (DU) 606 may host one or more TRPs. The DU may be located at edges of the network with radio frequency (RF) functionality.

As indicated above, FIG. 6 is provided merely as an example. Other examples may differ from what is described with regard to FIG. 6.

Figure 7:
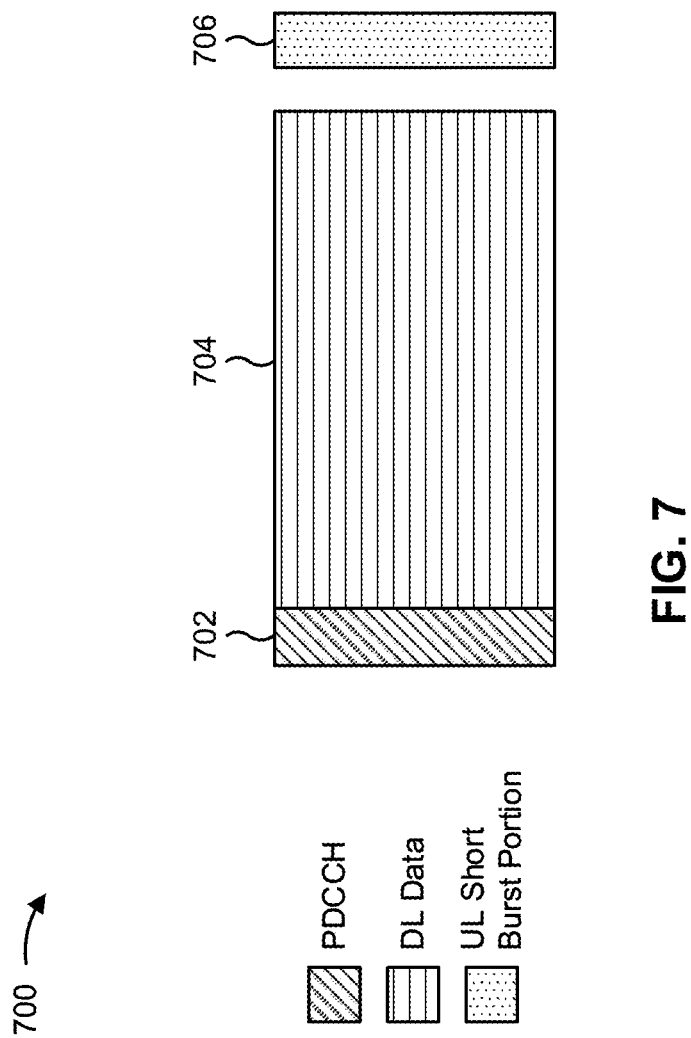
FIG. 7 is a diagram illustrating an example of a downlink (DL)-centric slot, in accordance with various aspects of the present disclosure.

FIG. 7 is a diagram 700 showing an example of a DL-centric slot or wireless communication structure. The DL-centric slot may include a control portion 702. The control portion 702 may exist in the initial or beginning portion of the DL-centric slot in some deployments. The control portion can also be located in other portions, such as middle or end according to other structural arrangements.

The control portion 702 may include various scheduling information and/or control information. This information can correspond to various portions of the DL-centric slot. In some configurations, the control portion 702 may be a physical DL control channel (PDCCH), as indicated in FIG. 7. In some aspects, the control portion 702 may include legacy PDCCH information, shortened PDCCH (sPDCCH) information), a control format indicator (CFI) value (e.g., carried on a physical control format indicator channel (PCFICH)), one or more grants (e.g., downlink grants, uplink grants, and/or the like), and/or the like.

The DL-centric slot may also include a DL data portion 704. The DL data portion 704 may sometimes be referred to as the payload of the DL-centric slot. The DL data portion 704 may include the communication resources utilized to communicate DL data from the scheduling entity (e.g., UE or BS) to the subordinate entity (e.g., UE). In some configurations, the DL data portion 704 may be a physical DL shared channel (PD SCH).

The DL-centric slot may also include an UL short burst portion 706. The UL short burst portion 706 may sometimes be referred to as an UL burst, an UL burst portion, a common UL burst, a short burst, an UL short burst, a common UL short burst, a common UL short burst portion, and/or various other suitable terms. In some aspects, the UL short burst portion 706 may include one or more reference signals. Additionally, or alternatively, the UL short burst portion 706 may include feedback information corresponding to various other portions of the DL-centric slot.

Feedback in the UL short burst portion 706 may vary. For example, the UL short burst portion 706 may include feedback information corresponding to the control portion 702 and/or the data portion 704. Non-limiting examples of information that may be included in the UL short burst portion 706 include an acknowledgment (ACK) signal (e.g., a physical uplink control channel (PUCCH) ACK, a physical uplink shared channel (PUSCH) ACK, an immediate ACK), a negative ACK (NACK) signal (e.g., a PUCCH NACK, a PUSCH NACK, an immediate NACK), a scheduling request (SR), a buffer status report (BSR), a hybrid automatic repeat request (HARD) indicator, a channel state indication (CSI), a channel quality indicator (CQI), a sounding reference signal (SRS), a demodulation reference signal (DMRS), PUSCH data, and/or various other suitable types of information. The UL short burst portion 706 may include additional or alternative information, such as information pertaining to random access channel (RACH) procedures, scheduling requests, and various other suitable types of information.

As illustrated in FIG. 7, the end of the DL data portion 704 may be separated in time from the beginning of the UL short burst portion 706. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). The foregoing is merely one example of a DL-centric wireless communication structure, and alternative structures having similar features may exist without necessarily deviating from the aspects described herein.

As indicated above, FIG. 7 is provided merely as an example. Other examples may differ from what is described with regard to FIG. 7.

Figure 8:
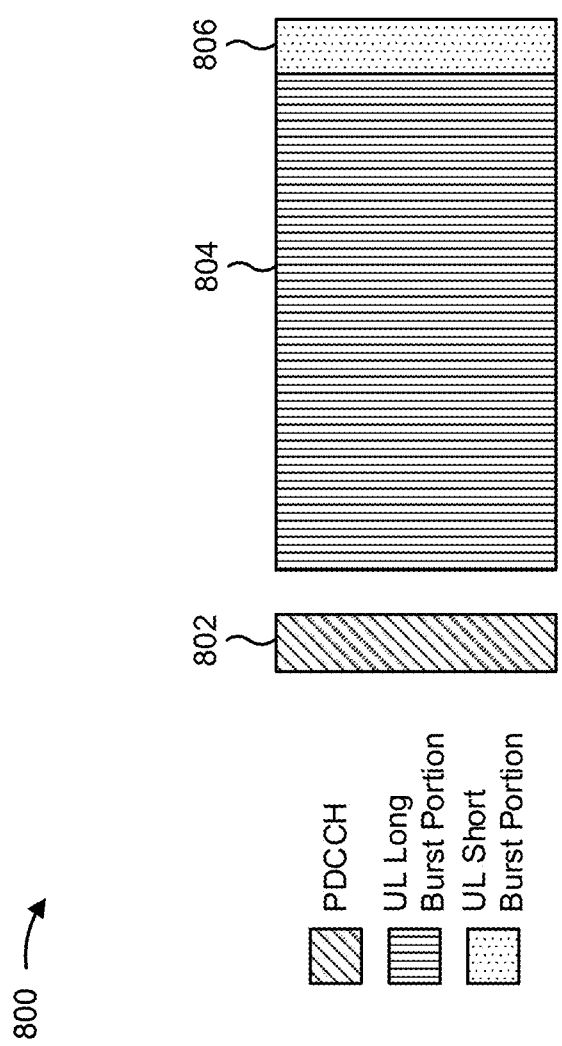
FIG. 8 is a diagram illustrating an example of an uplink (UL)-centric slot, in accordance with various aspects of the present disclosure.

FIG. 8 is a diagram 800 showing an example of an UL-centric slot or wireless communication structure. The UL-centric slot may include a control portion 802. The control portion 802 may exist in the initial or beginning portion of the UL-centric slot. The control portion 802 in FIG. 8 may be similar to the control portion 702 described above with reference to FIG. 7. The UL-centric slot may also include an UL long burst portion 804. The UL long burst portion 804 may sometimes be referred to as the payload of the UL-centric slot. The UL portion may refer to the communication resources utilized to communicate UL data from the subordinate entity (e.g., UE) to the scheduling entity (e.g., UE or BS). In some configurations, the control portion 802 may be a physical DL control channel (PDCCH).

As illustrated in FIG. 8, the end of the control portion 802 may be separated in time from the beginning of the UL long burst portion 804. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity).

The UL-centric slot may also include an UL short burst portion 806. The UL short burst portion 806 in FIG. 8 may be similar to the UL short burst portion 706 described above with reference to FIG. 7, and may include any of the information described above in connection with FIG. 7. The foregoing is merely one example of an UL-centric wireless communication structure, and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying a signal communication through the scheduling entity (e.g., UE or B S). In some sidelink deployments, a scheduling entity may be utilized for scheduling and/or control purposes. Whereas in other deployments, subordinate entities can communicate without scheduling entity control. In some aspects, the sidelink signals may be communicated using a licensed spectrum (unlike wireless local area networks, which typically use an unlicensed spectrum). Also, sidelink signals may be communicated via signals transmitted in a non-licensed spectrum.

In one example, a wireless communication structure, such as a frame, may include both UL-centric slots and DL-centric slots. In this example, the ratio of UL-centric slots to DL-centric slots in a frame may be dynamically adjusted based at least in part on the amount of UL data and the amount of DL data that are transmitted. For example, if there is more UL data, then the ratio of UL-centric slots to DL-centric slots may be increased. Conversely, if there is more DL data, then the ratio of UL-centric slots to DL-centric slots may be decreased.

As indicated above, FIG. 8 is provided merely as an example. Other examples may differ from what is described with regard to FIG. 8.

For communication in an unlicensed band, a channel in an UL and/or a DL transmission (e.g., a transmission opportunity (TXOP)) is acquired in an opportunistic manner via a listen-before-talk (LBT) procedure. After the channel is acquired, the TXOP may extend for a channel occupancy time (COT). In unlicensed millimeter wave (mmWave or mmW) bands, the LBT procedure can be directional, meaning that a wireless node uses receive (RX) beam forming to listen to the channel from a specific direction. Additionally or alternatively, during a directional LBT procedure, a wireless node uses a pseudo-omni-directional LBT procedure to listen to the channel from multiple directions. When the LBT has a successful result for a specific direction for a directional LBT procedure, meaning that energy the channel from the specific direction is lower than a threshold for a defined period of time, the wireless node may determine a set of beams to use during a TXOP by the direction of the LBT procedure based at least in part on a set of rules.

In licensed mmWave bands, synchronization signal and PBCH blocks (SSBs, sometimes referred to as SS/PBCH blocks) are used with beamforming for channel discovery and/or synchronization. For example, in NR licensed bands, such as frequency range (FR) 2, up to 64 SSBs with different beams can be transmitted within a 5 millisecond (ms) duration (e.g., within a synchronization signal (SS) burst set). The beams used to transmit the up to 64 SSBs may be spatially distributed (e.g., at angular and/or spatial deflections from one another) across a coverage area of a transmitter of the up to 64 SSBs. In unlicensed bands, an LBT procedure may be used for channel discovery and/or synchronization. A wireless node (e.g., a BS and/or a UE) may not be capable of performing channel discovery and synchronization in an unlicensed mmWave band using a combination of LBT procedures and SSBs, for example, due to the variability in different SSB configurations or spatial distributions of SSB transmit beams.

Some techniques and apparatuses described herein provide for performing an LBT procedure for an SSB. For example, a wireless node may utilize an LBT procedure for an SSB of an SS burst set for resource selection, channel discovery, and/or channel synchronization in an unlicensed mmWave band. A directional coverage of the LBT procedure may be based at least in part on a directional coverage of the SSB or a set of SSBs. This improves communications of the wireless node by facilitating resource selection for an SSB in an unlicensed mmWave band. In addition, various aspects described herein provide for collision avoidance of SSBs transmitted from multiple wireless nodes. Avoiding collisions can improve communications of the wireless nodes. Indeed, reducing or eliminating waste of processing resources that would otherwise occur as a result of a collision, and/or the like can yield efficient, quality communications.

Figure 9:
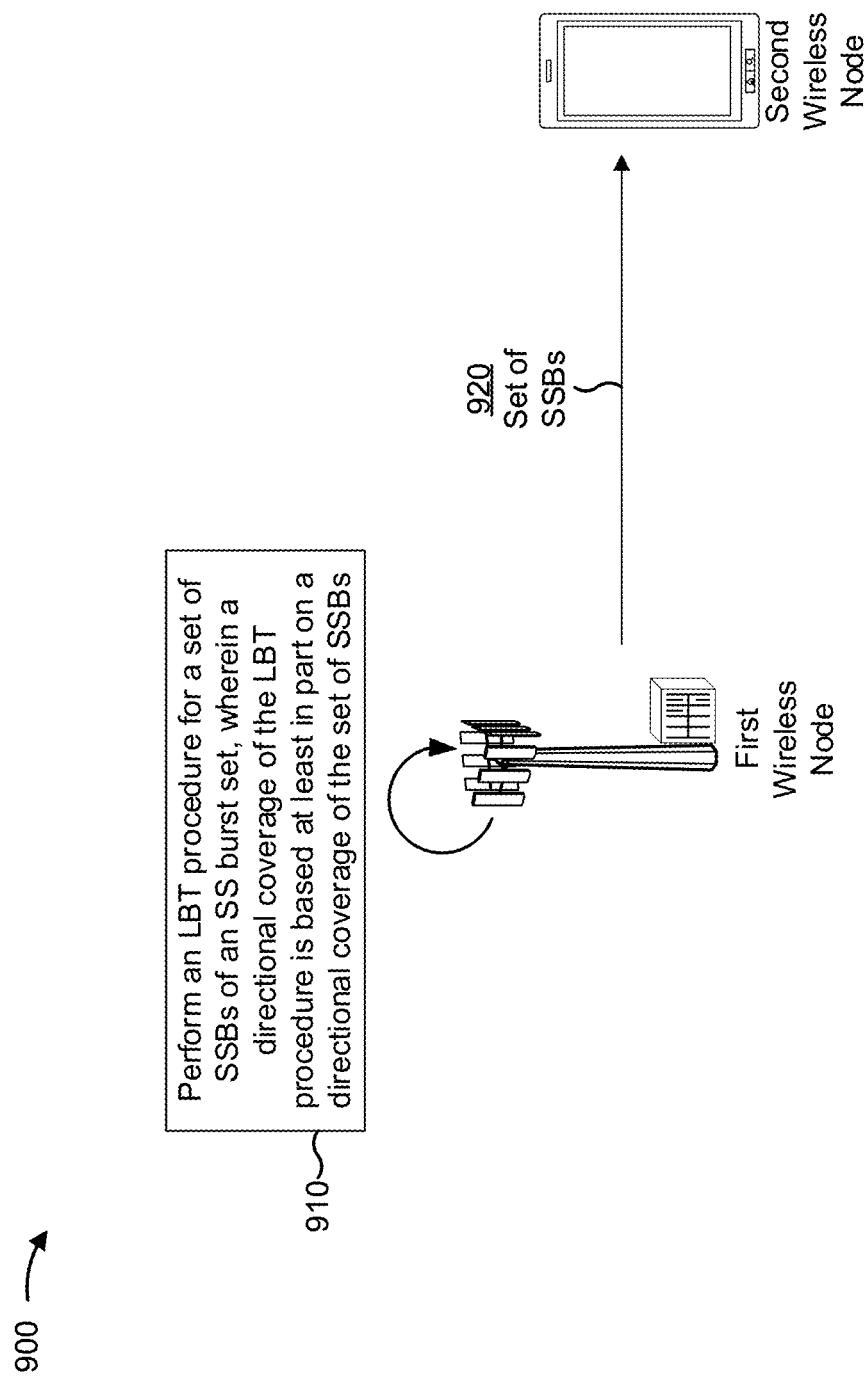
FIG. 9 is a diagram illustrating an example of performing a listen-before-talk (LBT) procedure for synchronization signal and physical broadcast channel (PBCH) block (SSB), in accordance with various aspects of the present disclosure.

FIG. 9 is a diagram illustrating an example 900 of performing an LBT procedure for an SSB, in accordance with various aspects of the present disclosure. As shown in FIG. 9, example 900 includes a first wireless node (e.g., BS 110) and a second wireless node (e.g., UE 120).

As shown by reference number 910, the first wireless node may perform an LBT procedure. In some aspects, the LBT procedure can be specific for a set of SSBs of an SS burst set. A directional coverage of the LBT procedure can be based at least in part on a directional coverage of a set of SSBs. For example, the first wireless node may perform the LBT procedure for the set of SSB of the SS burst set based at least in part on a periodicity of the SS burst set. In some aspects, the first wireless node may be configured to transmit an SS burst set at a particular periodicity (e.g., periodically, at an interval, according to a schedule, and/or the like), and the first wireless node may perform the LBT procedure at the same particular periodicity and prior to transmitting the SS burst set. A directional coverage of a beam may refer to an angular direction and/or a spatial coverage area that the beam is transmitted to and/or received from. Thus, a directional coverage of an LBT operation may refer to a direction or coverage area of a receive beam used for the LBT operation, and a directional coverage of an SSB may refer to a direction or coverage area of a transmit beam used to transmit the SSB. The relationship between the directional coverages of the LBT procedure and the set of SSBs is described in more detail elsewhere herein.

SSBs may be arranged in a variety of formats. In some aspects, a set of SSBs may include a single SSB (e.g., for a per SSB LBT procedure). In some aspects, the set of SSBs may include multiple SSBs. For example, the set of SSBs may include multiple consecutive SSBs (e.g., SSBs that occupy consecutive symbols of a slot (or multiple symbols across multiple slots) of the SS burst set). Additionally, or alternatively, and as another example, the set of SSBs may include multiple non-consecutive SSBs (e.g., where at least two of the multiple SSBs are separated by a set of unoccupied symbols or slots).

Additionally, or alternatively, and as another example, the set of SSBs may include multiple SSBs. The SSBs may be grouped in various manners. Groupings may be based on a number of factors. In some deployments, groups can be based at least in part on a directional proximity of a transmission direction (or directional coverage) of the SSBs. Directional proximity may be defined based at least in part on a spatial relationship of two or more beams with each other, and two beams may be grouped based at least in part on the two beams being associated with a proximity condition regarding directional proximity of the two beams. For example, two beams may be associated with a proximity condition when the two beams are adjacent to each other in a plurality of beams generated by wireless node. As another example, two beams may be associated with a proximity condition when the two beams at least partially overlap each other. As a third example, two beams may be associated with a proximity condition when an angular offset of directions of the two beams is lower than a threshold.

In some aspects, the set of SSBs may include a total set of SSBs of the SS burst set (e.g., the set of SSBs may comprise an SS burst set). For example, if the SS burst set includes X quantity of SSBs, then the wireless node may perform the LBT procedure for the X quantity of SSBs as a single group, where the X quantity of SSBs is referred to as the total set of SSBs of the SS burst set.

In some aspects, the directional coverage of the LBT procedure may match the directional coverage of SSBs of the set of SSBs. As used herein, the directional coverage of an LBT procedure may match the directional coverage of an SSB when a receive beam used to perform a listening operation of the LBT procedure is spatially aligned with a transmit beam used to transmit the SSB or has a same beam direction as the transmit beam used to transmit the SSB. For example, when an SSB has a particular directional coverage (e.g., the SSB is transmitted using a transmit beam formed at a particular angle relative to the first wireless node), the LBT procedure may have the same particular directional coverage, meaning that the LBT procedure is performed using receive beams directed at the particular angle relative to the first wireless node. In some aspects, when the set of SSBs includes multiple SSBs, such as when the set of SSBs includes a total set of SSBs of the SS burst set, the set of SSBs may be associated with a variety of directional coverages, meaning that the set of SSBs is transmitted using a variety of transmit beams at respective angles relative to the first wireless node. In this case, the directional coverage of the LBT procedure may be a pseudo-omni-directional coverage for the total set of SSBs, meaning that the LBT procedure is performed using a receive beam that is a pseudo-omni-directional beam that covers the variety of directional coverages of the transmit beams used to transmit the set of SSBs. In some aspects, a directional coverage of an LBT procedure and an SSB may match based at least in part on respective beams of the LBT procedure and the SSB overlapping each other (e.g., fully overlapping, substantially overlapping, at least partially overlapping, the coverage area of one beam including the coverage area of another beam, and/or the like).

In some aspects, the wireless node may use different types of LBT procedures in different scenarios within the SS burst set. For example, the LBT procedure used for a set of SSBs may be based at least in part on a maximum channel occupancy time (COT) associated with the SS burst set. In some aspects, the LBT procedure may be a category 4 LBT procedure based at least in part on the maximum COT being shorter than a length (e.g., a slot length or a symbol length) of the SS burst set. As another example, the LBT procedure may be a category 2 LBT procedure based at least in part the maximum COT being greater than or equal to a length of the SS burst set. Thus, the LBT procedure may be selected based at least in part on a length of the maximum COT relative to the SS burst set.

Additionally, or alternatively, and as another example, the LBT procedure may be a category 4 LBT procedure based at least in part on the set of SSBs including a total set of SSBs of the SS burst set. As used herein, a category 2 LBT procedure may refer to an LBT operation that does not use a random back-off, whereas a category 4 LBT procedure may refer to an LBT operation with a random back-off and a variable size of contention window (CW). Generally, category 2 LBT procedures may involve shorter CWs than category 4 LBT procedures. For example, a category 4 LBT procedure may involve an extended clear channel assessment (eCCA) of a variable length, whereas a category 2 LBT procedure may involve a CCA window of a deterministic length. One example definition of category 4 and category 2 LBT procedures is provided in Section 8.2 of Release 13 of 3GPP Technical Report 36.889.

LBT deployments may include use of contention window features, as mentioned above. In some aspects, a length of a contention window associated with the LBT procedure may be based at least in part on a quantity of SSBs included in the set of SSBs. For example, when the set of SSBs includes multiple non-consecutive SSBs, the length of the contention window may be based at least in part on a quantity of SSBs included in the multiple non-consecutive SSBs. As a specific example, a contention window of a first length may be used for the LBT procedure up to a first quantity of SSBs included in the multiple non-consecutive SSBs, a contention window of a second length may be used for the LBT procedure from the first quantity up to a second quantity of SSBs included in the multiple non-consecutive SSBs, and so on. And, alternatively or additionally, in some deployments, the contention window may be varying amounts of time. For example, contention windows may be in the range of microseconds (e.g., a contention window for up to $M_1$ SSBs per group may be of 2 microseconds, a contention window for up to $M_2$ SSBs per group ($M_2 > M_1$) may be of 4 microseconds, and so on).

As shown by reference number 920, the first wireless node may transmit, to a second wireless node, the set of SSBs based at least in part on a successful result of the LBT procedure. For example, the first wireless node may successfully identify resources (e.g., time and/or frequency resources) on which to transmit the set of SSBs based at least in part on performing the LBT procedure (e.g., may identify resources that will be unoccupied from a scheduled start of the SS burst set for the length of the SS burst set), and may transmit the set of SSBs on the resources based at least in part on successfully identifying the resources. The second wireless node may receive the set of SSBs and may perform channel discovery and/or synchronization based at least in part on the set of SSBs.

In some aspects, the first wireless node may transmit a single SSB or multiple SSBs based at least in part on the successful result of the LBT procedure, depending on a quantity of SSBs included in the set of SSBs. For example, when the set of SSBs includes multiple SSBs, the wireless node may transmit multiple consecutive SSBs, may transmit multiple non-consecutive SSBs, may transmit a total set of SSBs associated with the SS burst set, and/or the like, depending on a quantity and/or configuration of SSBs included in the set of SSBs.

The first wireless node may determine a successful result of an LBT procedure when the medium is clear (e.g., when a measurement of energy on the channel in the direction of the LBT procedure is lower than a threshold) for the length of time defined by the LBT procedure. The first wireless node may determine a failure of the LBT procedure when the medium is not clear for the length of time defined by the LBT window. In some cases, after a failure of the LBT procedure, the first wireless node may subsequently determine a successful result of the LBT procedure (e.g., when the first wireless node determines that the measurement on the channel in the direction of the LBT procedure is lower than the threshold for the length of time defined by the contention window) and may determine a resource allocation (including acquired resources associated with the LBT procedure) according to the subsequent successful result. In this case, the resource allocation may be shifted later in time and/or may be shorter in time than when the LBT procedure is immediately successful.

SSB management may be carried out in a variety of manners. In some aspects, the first wireless node may drop a set of SSBs. For example, the first wireless node may drop a set of SSBs based at least in part on a failed result of the LBT procedure (e.g., based at least in part on the first wireless node failing to identify or acquire resources on which to transmit the set of SSBs). In some aspects, the first wireless node may drop a portion of a set of SSBs. For example, depending on a timing of the LBT procedure relative to a scheduled start of the SS burst set, the first wireless node may drop a portion of the set of SSBs. This dropping may be due to a delay in determining a successful result of the LBT procedure causing the first wireless node to fail to determine the successful result prior to a scheduled start of a transmission of the set of SSBs (e.g., the delay may cause the first wireless node to begin the transmission with an SSB subsequent to a first SSB of the set of SSBs rather than the first SSB of the set of SSBs). As a specific example, when the set of SSBs includes a total set of SSBs of the SS burst set (e.g., all SSBs of the SS burst set), the first wireless node may not determine a successful result of the LBT procedure until after a scheduled start of the SS burst set, meaning that the resources secured for the transmission of the SS burst set may start after a beginning of the SS burst set. In this case, the wireless node may start transmitting the set of SSBs with an SSB other than the first SSB of the SS burst set due to the delay in determining the successful result.

In some aspects, the first wireless node may transmit a non-SSB signal, such as a filler signal. Transmissions can be between non-consecutive SSBs of the set of SSBs in association with transmitting the set of SSBs. For example, the first wireless node may transmit a signal to occupy unoccupied symbols and/or slots between non-consecutive SSBs of the set of SSBs and/or between different sets of SSBs. Transmitting a signal to occupy unoccupied symbols and/or slots between non-consecutive SSBs reduces or eliminates a possibility of a collision between a transmission of the set of SSBs and another transmission by another wireless node by reducing or eliminating a possibility of the other wireless node determining a successful result of an LBT procedure for the unoccupied symbols and/or slots. In addition, transmitting a signal to occupy unoccupied symbols and/or slots between non-consecutive SSBs conserves processing resources of the first wireless node and/or the other wireless node that would otherwise be wasted (e.g., due to a collision). And transmission in this manner can improve communications of the first wireless node and/or the other wireless node by reducing or eliminating collisions.

As indicated above, FIG. 9 is provided as an example. Other examples may differ from what is described with respect to FIG. 9.

Figure 10A:
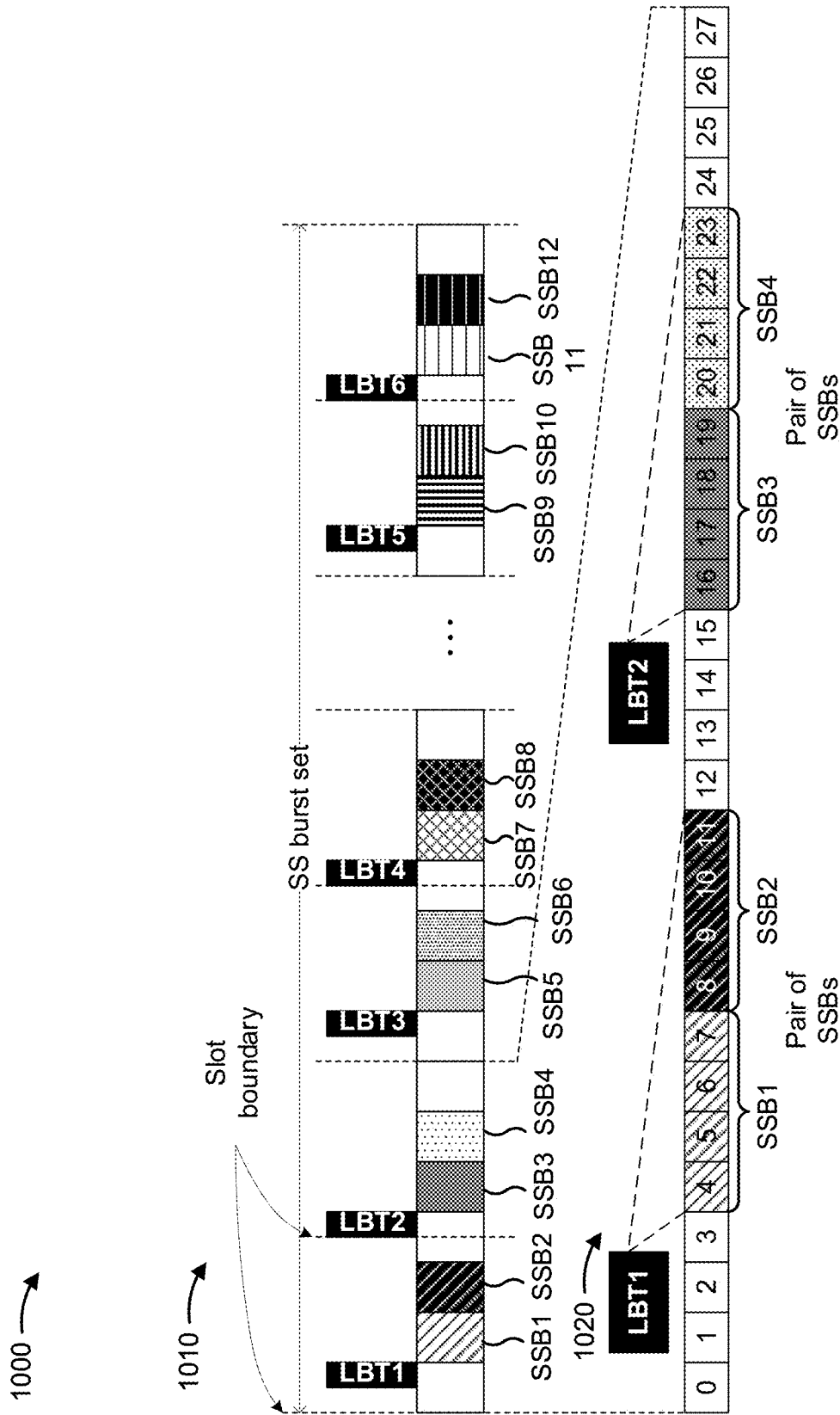
FIGS. 10A-10C are diagrams illustrating one or more examples of performing a listen-before-talk (LBT) procedure for synchronization signal and physical broadcast channel (PBCH) block (SSB), in accordance with various aspects of the present disclosure.
Figure 10B:
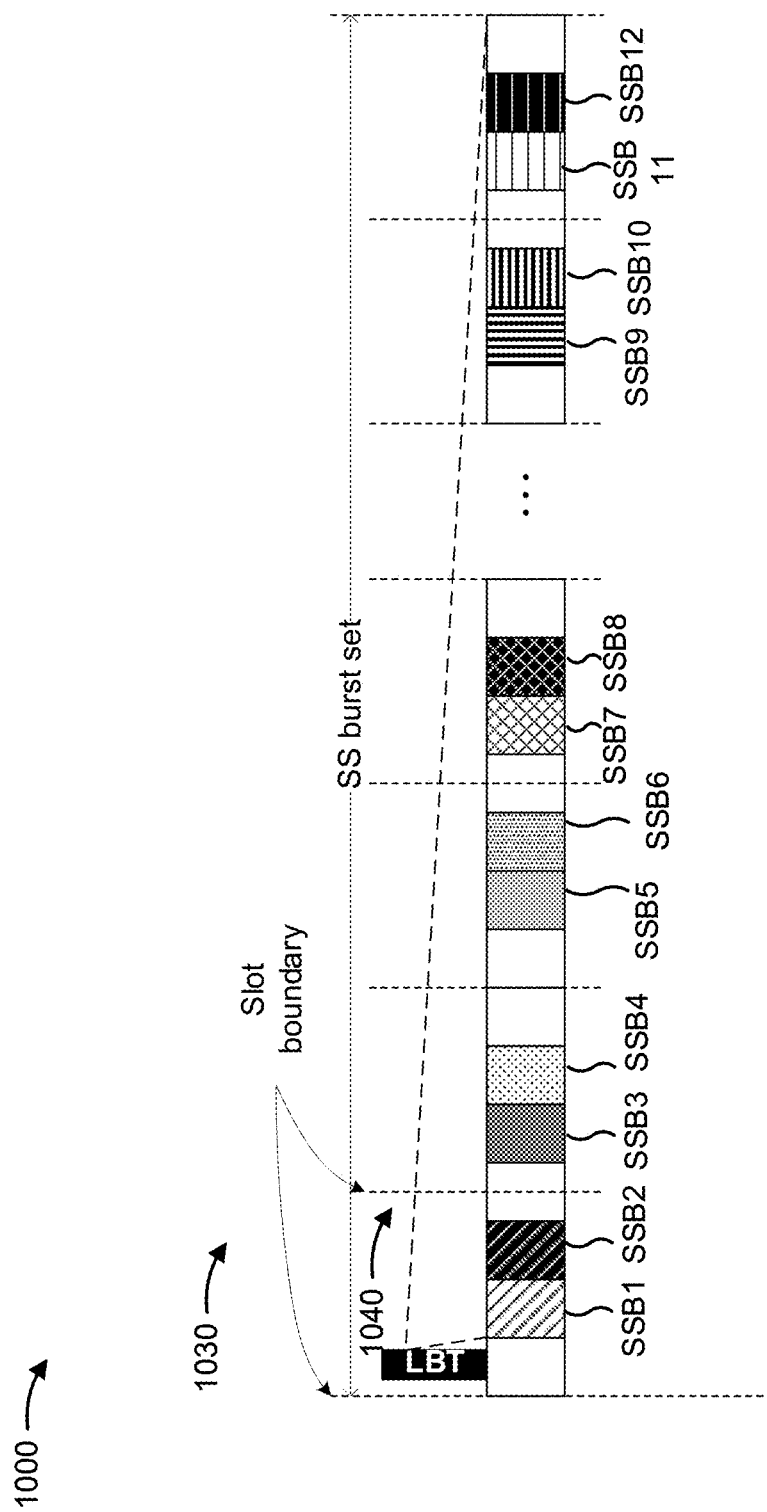
Figure 10C:
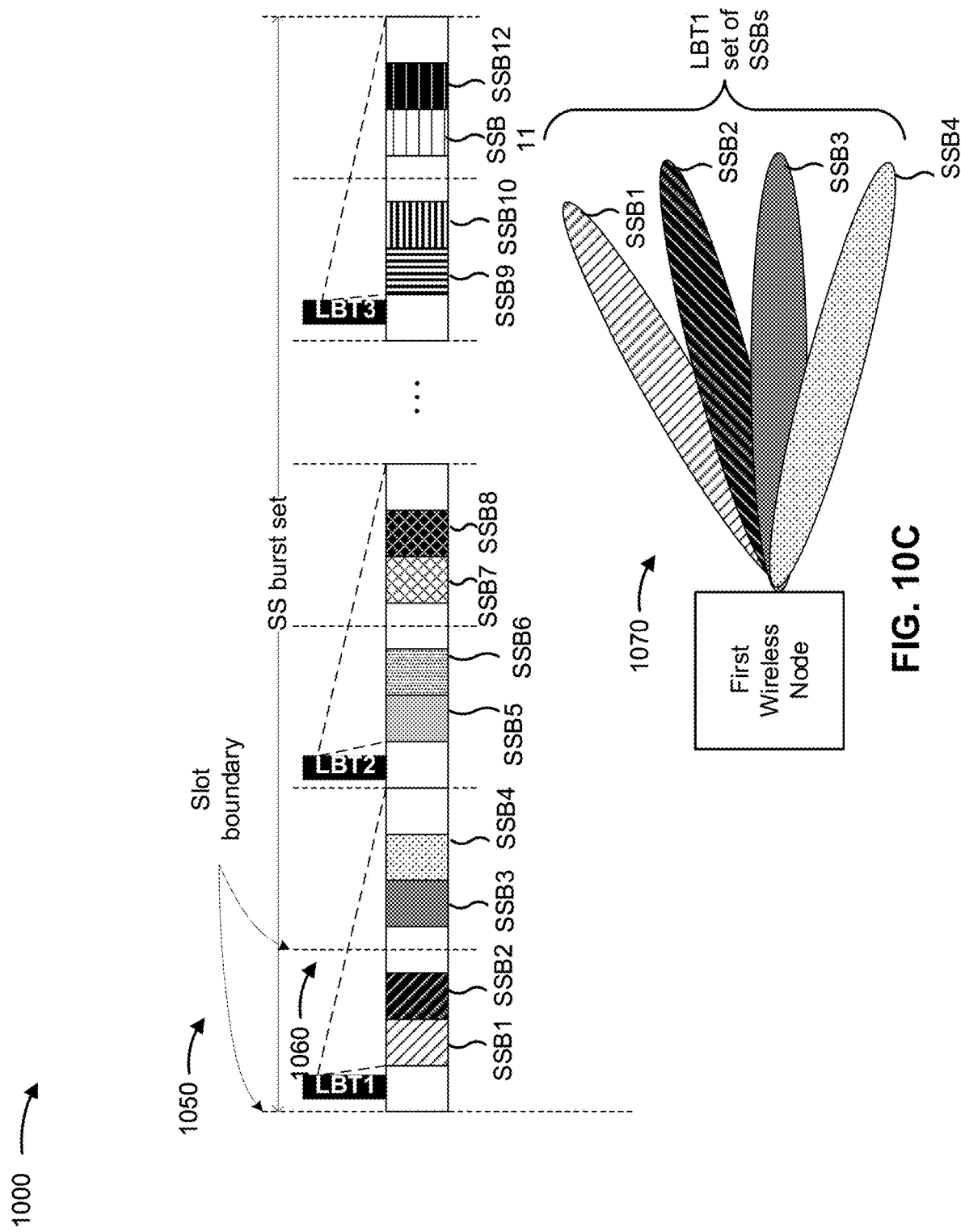

FIGS. 10A-10C are diagrams illustrating one or more examples 1000 of performing an LBT procedure for an SSB, in accordance with various aspects of the present disclosure. FIGS. 10A-10C show one or more examples of performing one or more LBT procedures for an SS burst set.

FIG. 10A shows an example of performing a respective LBT procedure for multiple sets of SSBs of an SS burst set. In some LBT procedure deployments, a set of SSBs includes multiple consecutive SSBs. Reference number 1010 shows an example SS burst set for which a wireless node may perform multiple LBT procedures. As further shown by reference number 1010, the SS burst set includes multiple SSBs (e.g., SSB1 through SSB12) and unoccupied slots between some of the SSBs (shown as white rectangles). Additionally, reference number 1010 shows various LBT procedures that the wireless node may perform for the SS burst set (e.g., LBT procedures LBT1 through LBT6).

Reference number 1020 shows a subset of symbols of the SS burst set (e.g., symbols 0-27 of the SS burst set). Some symbols are unoccupied (shown as white squares) and some are occupied by SSBs (shown by patterned or filled squares). As shown by reference number 1020, the wireless node may perform an LBT procedure for multiple consecutive SSBs (e.g., a pair of SSBs). For example, the wireless node may perform LBT procedure LBT1 for SSB1 (e.g., slots 4-7) and SSB2 (e.g., slots 8-11), which may be consecutive SSBs based at least in part on there not being any unoccupied slots and/or symbols between an end of SSB1 (e.g., symbol 7) and a start of SSB2 (e.g., symbol 8). In some aspects, the wireless node may transmit or drop the multiple consecutive SSBs (e.g., SSB1 and SSB2) as a group depending on a result of the LBT1 (e.g., may drop or transmit the pair of SSBs). In some aspects, the wireless node may transmit a non-SSB signal on unoccupied symbols between transmissions of SSBs (e.g., slots 12-15 shown in FIG. 10A).

FIG. 10B shows an example of a wireless node performing an LBT procedure for a total set of SSBs of an SS burst set. Reference number 1030 shows an example SS burst set for which the wireless node may perform an LBT procedure. For example, the SS burst set include various slots, some of which are unoccupied (e.g., shown by white rectangles) and some of which are associated with various SSBs (e.g., SSB1 through SSB12, shown by colored or patterned rectangles). As shown by reference number 1040, the wireless node may perform an LBT procedure prior to a start of the first SSB of the SS burst set (e.g., SSB1) and may perform the LBT for the total set of SSBs of the SS burst set. In some aspects, depending on a relative timing of performance of the LBT procedure to the scheduled start of SSB1, the wireless node may drop SSB1 and one or more other SSBs at the beginning of the SS burst set (e.g., SSB2, SSB3, and/or the like) due to the wireless node failing to determine a successful result of the LBT procedure until after the scheduled start of the SS burst set. In some aspects, the wireless node may drop the total set of SSBs (e.g., SSB1 through SSB12) as a group based at least in part on a failed result of the LBT procedure.

FIG. 10C shows an example of a wireless node performing various LBT procedures for multiple sets of SSBs that include multiple non-consecutive SSBs. In some aspects, and as described below, multiple non-consecutive SSBs may be grouped into a set of SSBs based at least in part on a respective transmission direction associated with the multiple non-consecutive SSBs.

Reference number 1050 shows an example SS burst set for which the wireless node may perform the various LBT procedures. For example, the SS burst set may include various slots, some of which are unoccupied (shown by white rectangles) and some of which are associated with various SSBs (e.g., SSB1 through SSB12, shown by patterned or filled rectangles). As shown by reference number 1060, the wireless node may perform a respective LBT procedure (e.g., LBT procedures LBT1 through LBT3) for various sets of SSBs that include unoccupied slots between some of the SSBs of the various sets of SSBs (e.g., SSB2 and SSB3, which are associated with LBT1, are separated by an unoccupied slot, thereby causing SSB2 and SSB3 to be non-consecutive).

In some aspects, the wireless node may transmit or drop a set of SSBs associated with an LBT procedure as a group based at least in part on a result of the LBT procedure. For example, the wireless node may transmit SSB1 through SSB4 based at least in part on a result of LBT1 being successful and the wireless node may drop SSB1 through SSB4 based at least in part on a result of LBT1 being unsuccessful. In some aspects, SSBs may be included in a set of SSBs based at least in part on a directional proximity of transmission directions of the SSBs. For example, and as shown by reference number 1070, SSB1 through SSB4 may be included a set of SSBs associated with LBT1 based at least in part on the transmission directions of SSB1 through SSB4 being associated with a proximity condition, being adjacent to each other, being within a threshold proximity of each other, and/or the like.

As indicated above, FIGS. 10A-10C are provided as an example. Other examples may differ from what is described with respect to FIGS. 10A-10C.

Figure 11:
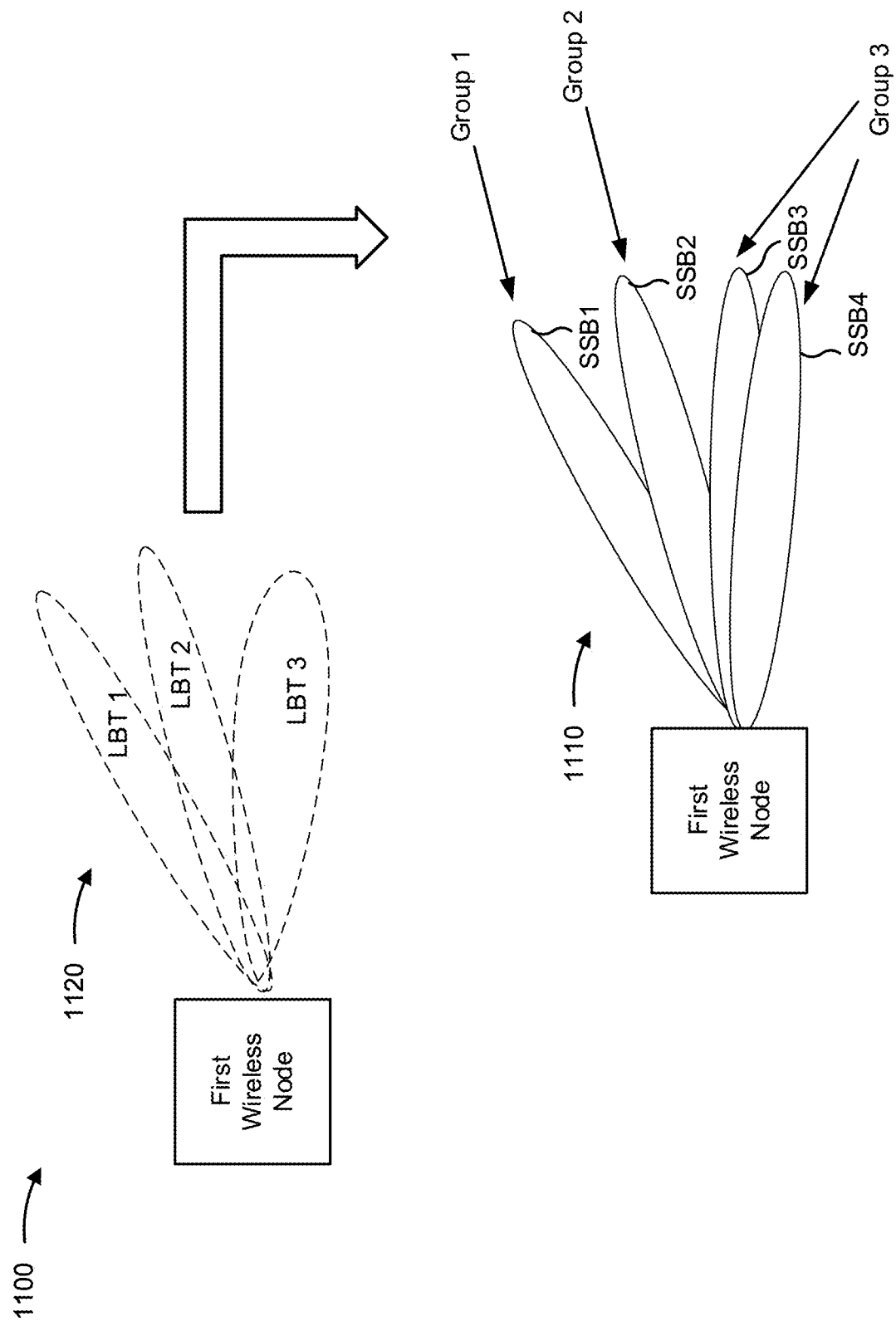
FIG. 11 is a diagram illustrating an example 1100 of respective direction directional coverages of an LBT procedure and a corresponding set of SSBs, in accordance with various aspects of the present disclosure.

FIG. 11 is a diagram illustrating an example 1100 of respective direction directional coverages of an LBT procedure and a corresponding set of SSBs, in accordance with various aspects of the present disclosure. As shown, the operations described in FIG. 11 are performed by a first wireless node, which is described with regard to FIGS. 9 and 10A-10C. FIG. 11 shows the first wireless node securing resources for transmission of a set of SSBs (SSB1, SSB2, SSB3, and SSB4, shown at reference number 1110) using respective LBT operations (LBT 1, LBT 2, and LBT3, shown at reference number 1120 and performed before the operations shown by reference number 1110).

As shown by reference number 1110, a first wireless node may transmit SSB1, SSB2, SSB3, and SSB4 with respective directional coverages. For example, the respective directional coverages may be based at least in part on respective transmit beams used to transmit SSB1, SSB2, SSB3, and SSB4, such as based at least in part on respective angular displacements relative to the first wireless node and/or the like. As further shown, SSB1 is associated with a first group, SSB2 is associated with a second group, and SSB3 and SSB4 are associated with a third group. In some aspects, SSB3 and SSB4 may be grouped based at least in part on directional proximity of SSB3 and SSB4. For example, here, the directional coverages of SSB3 and SSB4 may at least partially overlap, meaning that SSB3 and SSB4 may be group based at least in part on directional proximity of SSB3 and SSB4. Additionally, or alternatively, SSB3 and SSB4 may be grouped based at least in part on being adjacent to each other relative to other SSBs transmitted by the first wireless node. Additionally, or alternatively, SSB3 and SSB4 may be group based at least in part on an angular direction of SSB3 relative to SSB4 (or vice versa) being lower than a threshold.

As shown by reference number 1120, before transmitting the SSBs, the first wireless node may perform LBT 1, LBT 2, and LBT 3 to secure resources for transmitting the SSBs. As further shown, directional coverages of LBT 1, LBT 2, and LBT 3 match directional coverages of Group 1 (e.g., SSB1), Group 2 (e.g., SSB2), and Group 3 (e.g., SSB3 and SSB4). For example, LBT 1 and LBT 2 may be performed using receive beams that are spatially similar to or equivalent to transmit beams used for SSB1 and SSB2. Furthermore, LBT 3 may be performed using a receive beam, such as a pseudo-omni-directional receive beam, with a directional coverage that encompasses transmit beams used for SSB3 and SSB4.

Figure 12:
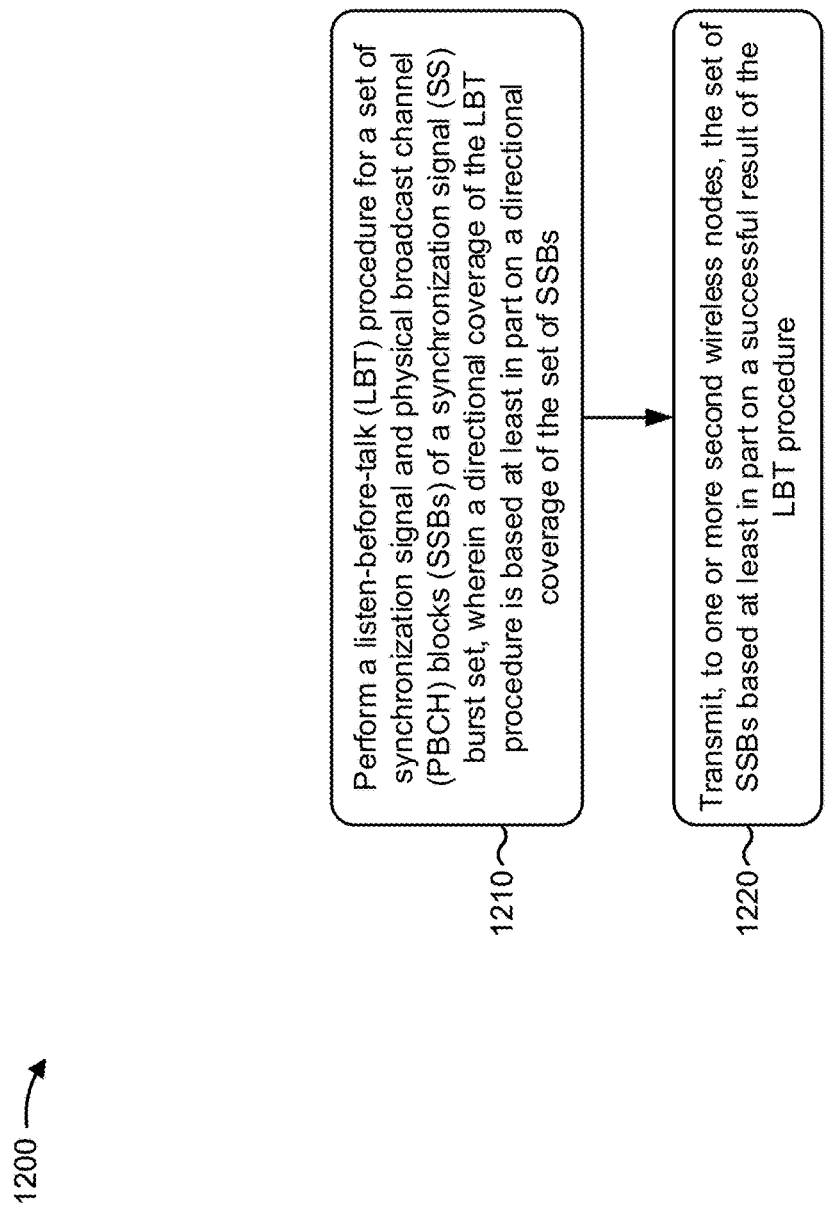
FIG. 12 is a diagram illustrating an example process performed, for example, by a wireless node, in accordance with various aspects of the present disclosure.

FIG. 12 is a diagram illustrating an example process 1200 performed, for example, by a wireless node, in accordance with various aspects of the present disclosure. Example process 1200 is an example process where a wireless node (e.g., BS 110, UE 120, and/or the like) performs an LBT procedure for an SSB.

As shown in FIG. 12, in some aspects, process 1200 may include performing a listen-before-talk (LBT) procedure for a set of synchronization signal and physical broadcast channel (PBCH) blocks (SSBs) of a synchronization signal (SS) burst set, wherein a directional coverage of the LBT procedure is based at least in part on a directional coverage of the set of SSBs (block 1210). For example, the wireless node (e.g., using antenna 234, DEMOD 232, MIMO detector 236, receive processor 238, controller/processor 240, controller/processor 280, transmit processor 264, TX MIMO processor 266, MOD 254, antenna 252, and/or the like) may perform an LBT procedure for a set of SSBs of an SS burst set, as described above. In some aspects, a directional coverage of the LBT procedure is based at least in part on a directional coverage of the set of SSBs.

As shown in FIG. 12, in some aspects, process 1200 may include transmitting, to one or more second wireless nodes, the set of SSBs based at least in part on a successful result of the LBT procedure (block 1220). For example, the wireless node (e.g., using controller/processor 240, transmit processor 220, TX MIMO processor 230, MOD 232, antenna 234, controller/processor 280, transmit processor 264, TX MIMO processor 266, MOD 254, antenna 252, and/or the like) may transmit, to one or more second wireless nodes, the set of SSBs based at least in part on a successful result of the LBT procedure, as described above.

Process 1200 may include additional aspects, such as any single aspect or any combination of aspects described below and/or in connection with one or more other processes described elsewhere herein.

In a first aspect, the directional coverage of the LBT procedure matches the directional coverage of SSBs of the set of SSBs. In a second aspect, alone or in combination with the first aspect, the set of SSBs includes multiple SSBs of the SS burst set, wherein the multiple SSBs occupy consecutive sets of symbols of the SS burst set.

In a third aspect, alone or in combination with one or more of the first and second aspects, the LBT procedure for the multiple SSBs is based at least in part on a maximum channel occupancy time (COT) associated with the SS burst set. In a fourth aspect, alone or in combination with one or more of the first through third aspects, the LBT procedure is a category 4 LBT procedure based at least in part on the maximum COT being shorter than a length of the SS burst set. In a fifth aspect, alone or in combination with one or more of the first through fourth aspects, the LBT procedure is a category 2 LBT procedure based at least in part the maximum COT being greater than or equal to a length of the SS burst set.

In a sixth aspect, alone or in combination with one or more of the first through fifth aspects, the set of SSBs includes a total set of SSBs of the SS burst set. In a seventh aspect, alone or in combination with one or more of the first through sixth aspects, the directional coverage of the LBT procedure for the total set of SSBs is a pseudo-omni-directional coverage.

In an eighth aspect, alone or in combination with one or more of the first through seventh aspects, the directional coverage of the LBT procedure matches a directional coverage of the total set of SSBs of the SS burst set. In a ninth aspect, alone or in combination with one or more of the first through eighth aspects, the LBT procedure is a category 4 LBT procedure based at least in part on the set of SSBs including the total set of SSBs.

In a tenth aspect, alone or in combination with one or more of the first through ninth aspects, a subset of the total set of SSBs is transmitted based at least in part on a timing of the successful result of the LBT procedure. In an eleventh aspect, alone or in combination with one or more of the first through tenth aspects, the wireless node may transmit, between non-consecutive SSBs of the total set of SSBs, a non-SSB signal in association with transmitting the total set of SSBs.

In a twelfth aspect, alone or in combination with one or more of the first through eleventh aspects, the set of SSBs includes multiple non-consecutive SSBs. In a thirteenth aspect, alone or in combination with one or more of the first through twelfth aspects, the directional coverage of the LBT matches a directional coverage of the multiple non-consecutive SSBs.

In a fourteenth aspect, alone or in combination with one or more of the first through thirteenth aspects, the multiple non-consecutive SSBs are based at least in part on a directional proximity of corresponding beams for the multiple non-consecutive SSBs. In a fifteenth aspect, alone or in combination with one or more of the first through fourteenth aspects, a length of a contention window associated with the LBT procedure is based at least in part on a quantity of SSBs included in the multiple non-consecutive SSBs.

In a sixteenth aspect, alone or in combination with one or more of the first through fifteenth aspects, the wireless node may transmit the multiple non-consecutive SSBs based at least in part on the successful result of the LBT procedure. In a seventeenth aspect, alone or in combination with one or more of the first through sixteenth aspects, the SS burst set is associated with at least two different types of LBT procedures for the multiple non-consecutive SSBs based at least in part on a maximum channel occupancy time (COT) associated with the SS burst set. In an eighteenth aspect, alone or in combination with one or more of the first through seventeenth aspects, the at least two different types of LBT procedures for the multiple non-consecutive SSBs include a category 4 LBT procedure based at least in part on the maximum COT being shorter than a length of the SS burst set. In a nineteenth aspect, alone or in combination with one or more of the first through eighteenth aspects, at least two different types of LBT procedures for the multiple non-consecutive SSBs include a category 2 LBT procedure based at least in part on the maximum COT being greater than or equal to a length of the SS burst set.

In a twentieth aspect, alone or in combination with one or more of the first through nineteenth aspects, the wireless node may transmit a non-SSB signal between the multiple non-consecutive SSBs or between different sets of multiple non-consecutive SSBs. In a twenty-first aspect, alone or in combination with one or more of the first through twentieth aspects, the wireless node may drop another set of SSBs based at least in part on a failed result of the LBT procedure. In a twenty-second aspect, alone or in combination with one or more of the first through twenty-first aspects, the wireless node may determine to perform the LBT procedure based at least in part on a periodicity of the SS burst set.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
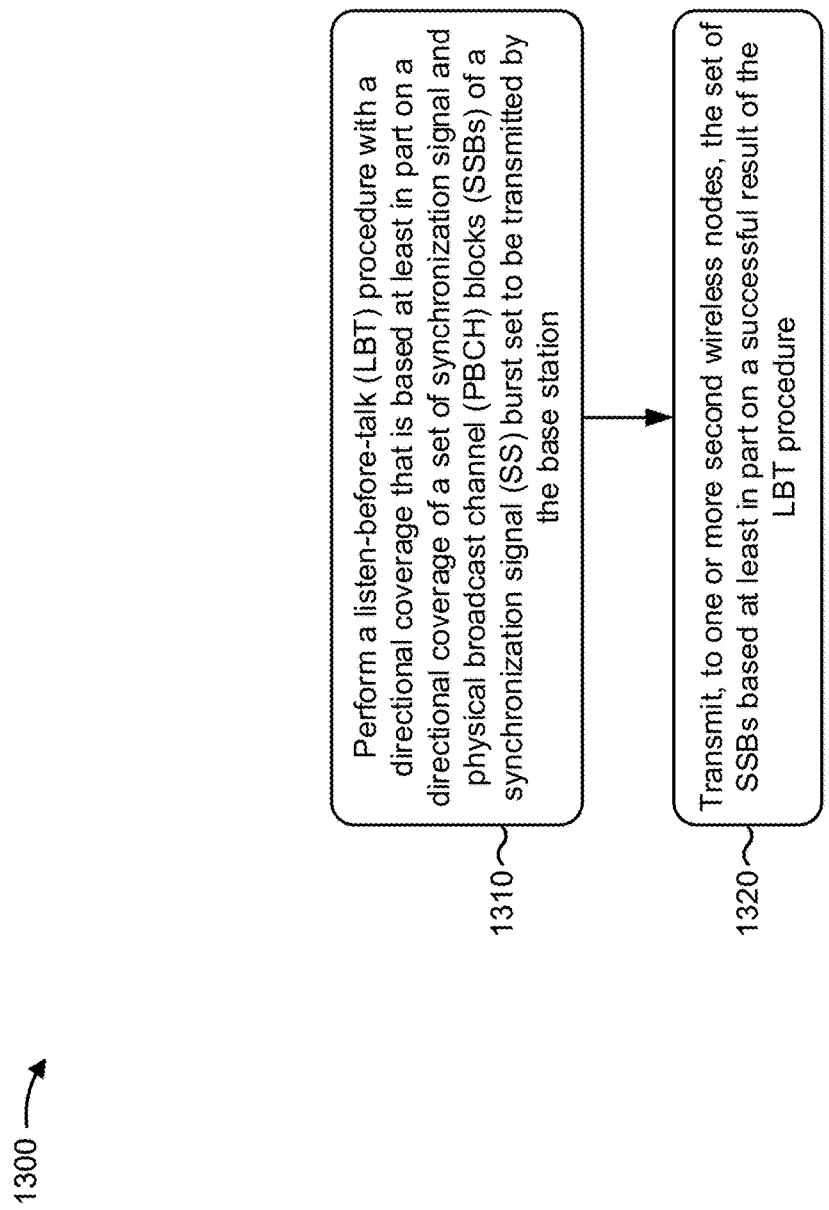
FIG. 13 is a diagram illustrating an example process performed, for example, by a wireless node, in accordance with various aspects of the present disclosure.

FIG. 13 is a diagram illustrating an example process 1300 performed, for example, by a wireless node, in accordance with various aspects of the present disclosure. Example process 1300 is an example process where a wireless node (e.g., BS 110, UE 120, and/or the like) performs an LBT procedure for an SSB.

As shown in FIG. 13, in some aspects, process 1300 may include performing a listen-before-talk (LBT) procedure with a directional coverage that is based at least in part on a directional coverage of a set of synchronization signal and physical broadcast channel (PBCH) blocks (SSBs) of a synchronization signal (SS) burst set to be transmitted by the base station (block 1310). For example, the wireless node (e.g., using antenna 234, DEMOD 232, MIMO detector 236, receive processor 238, controller/processor 240, controller/processor 280, transmit processor 264, TX MIMO processor 266, MOD 254, antenna 252, and/or the like) may perform an LBT procedure with a directional coverage that is based at least in part on a directional coverage of a set of SSBs of an SS burst set to the transmitted by the base station, as described above.

As shown in FIG. 13, in some aspects, process 1300 may include transmitting, to one or more second wireless nodes, the set of SSBs based at least in part on a successful result of the LBT procedure (block 1320). For example, the wireless node (e.g., using controller/processor 240, transmit processor 220, TX MIMO processor 230, MOD 232, antenna 234, controller/processor 280, transmit processor 264, TX MIMO processor 266, MOD 254, antenna 252, and/or the like) may transmit, to one or more second wireless nodes, the set of SSBs based at least in part on a successful result of the LBT procedure, as described above.

Process 1300 may include additional aspects, such as any single aspect or any combination of aspects described below and/or in connection with one or more other processes described elsewhere herein.

In a first aspect, the directional coverage of the LBT procedure matches the directional coverage of SSBs of the set of SSBs. In a second aspect, alone or in combination with the first aspect, the set of SSBs includes multiple SSBs of the SS burst set, wherein the multiple SSBs occupy consecutive sets of symbols of the SS burst set.

In a third aspect, alone or in combination with one or more of the first and second aspects, the LBT procedure for the multiple SSBs is based at least in part on a maximum channel occupancy time (COT) associated with the SS burst set. In a fourth aspect, alone or in combination with one or more of the first through third aspects, the LBT procedure is a category 4 LBT procedure based at least in part on the maximum COT being shorter than a length of the SS burst set. In a fifth aspect, alone or in combination with one or more of the first through fourth aspects, the LBT procedure is a category 2 LBT procedure based at least in part the maximum COT being greater than or equal to a length of the SS burst set.

In a sixth aspect, alone or in combination with one or more of the first through fifth aspects, the set of SSBs includes a total set of SSBs of the SS burst set. In a seventh aspect, alone or in combination with one or more of the first through sixth aspects, the directional coverage of the LBT procedure for the total set of SSBs is a pseudo-omni-directional coverage that matches a directional coverage of the total set of SSBs of the SS burst set. In an eighth aspect, alone or in combination with one or more of the first through seventh aspects, the LBT procedure is a category 4 LBT procedure based at least in part on the set of SSBs comprising the SS burst set.

In a ninth aspect, alone or in combination with one or more of the first through eighth aspects, a subset of the set of SSBs is transmitted based at least in part on a timing of the successful result of the LBT procedure. In a tenth aspect, alone or in combination with one or more of the first through ninth aspects, the wireless node may transmit, between non-consecutive SSBs of the SS burst set, a non-SSB signal in association with transmitting the total set of SSBs.

In an eleventh aspect, alone or in combination with one or more of the first through tenth aspects, the set of SSBs includes multiple non-consecutive SSBs. In a twelfth aspect, alone or in combination with one or more of the first through eleventh aspects, the directional coverage of the LBT matches a directional coverage of the multiple non-consecutive SSBs.

In a thirteenth aspect, alone or in combination with one or more of the first through twelfth aspects, the multiple non-consecutive SSBs are grouped based at least in part on a directional proximity of corresponding beams for the multiple non-consecutive SSBs. In a fourteenth aspect, alone or in combination with one or more of the first through thirteenth aspects, a length of a contention window associated with the LBT procedure is based at least in part on a quantity of SSBs included in the multiple non-consecutive SSBs.

In a fifteenth aspect, alone or in combination with one or more of the first through fourteenth aspects, the wireless node may transmit the multiple non-consecutive SSBs based at least in part on the successful result of the LBT procedure. In a sixteenth aspect, alone or in combination with one or more of the first through fifteenth aspects, the SS burst set is associated with at least two different types of LBT procedures for the multiple non-consecutive SSBs based at least in part on a maximum channel occupancy time (COT) associated with the SS burst set. In a seventeenth aspect, alone or in combination with one or more of the first through sixteenth aspects, the at least two different types of LBT procedures for the multiple non-consecutive SSBs include a category 4 LBT procedure based at least in part on the maximum COT being shorter than a length of the SS burst set. In an eighteenth aspect, alone or in combination with one or more of the first through seventeenth aspects, at least two different types of LBT procedures for the multiple non-consecutive SSBs include a category 2 LBT procedure based at least in part on the maximum COT being greater than or equal to a length of the SS burst set.

In nineteenth aspect, alone or in combination with one or more of the first through eighteenth aspects, the wireless node may drop another set of SSBs based at least in part on a failed result of the LBT procedure. In a twentieth aspect, alone or in combination with one or more of the first through nineteenth aspects, the wireless node may determine to perform the LBT procedure based at least in part on a periodicity of the SS burst set.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may, depending on context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a first wireless node, comprising:
performing a listen-before-talk (LBT) procedure with a directional coverage that is based at least in part on a directional coverage of a set of synchronization signal and physical broadcast channel (PBCH) blocks (SSBs) of a synchronization signal (SS) burst set to be transmitted by the first wireless node,
wherein a length of a contention window associated with the LBT procedure is based at least in part on a quantity of SSBs included in the set of SSBs; and
transmitting, to one or more second wireless nodes, the set of SSBs based at least in part on a successful result of the LBT procedure.

2. The method of claim 1, wherein the directional coverage of the LBT procedure matches the directional coverage of the set of SSBs.

3. The method of claim 1, wherein the set of SSBs includes multiple SSBs of the SS burst set, wherein the multiple SSBs occupy consecutive sets of symbols of the SS burst set.

4. The method of claim 3, wherein a category of the LBT procedure for the multiple SSBs is based at least in part on a maximum channel occupancy time (COT) associated with the SS burst set.

5. The method of claim 4, wherein the LBT procedure is a category 4 LBT procedure based at least in part on the maximum COT being shorter than a length of the SS burst set.

6. The method of claim 4, wherein the LBT procedure is a category 2 LBT procedure based at least in part the maximum COT being greater than or equal to a length of the SS burst set.

7. The method of claim 1, wherein the LBT procedure is a single LBT procedure and the set of SSBs includes a total set of SSBs of the SS burst set.

8. The method of claim 1, wherein the directional coverage of the LBT procedure for the set of SSBs is a pseudo-omni-directional coverage that matches a directional coverage of the of the SS burst set.

9. The method of claim 1, wherein the LBT procedure is a category 4 LBT procedure based at least in part on the set of SSBs comprising the SS burst set.

10. The method of claim 1, wherein a subset of the set of SSBs is transmitted based at least in part on a timing of the successful result of the LBT procedure.

11. The method of claim 1, wherein transmitting the set of SSBs comprises:
transmitting, between non-consecutive SSBs of the SS burst set, a non-SSB signal in association with transmitting the SS burst set.

12. The method of claim 1, wherein the set of SSBs includes multiple non-consecutive SSBs.

13. The method of claim 12, wherein the directional coverage of the LBT matches a directional coverage of the multiple non-consecutive SSBs.

14. The method of claim 12, wherein the multiple non-consecutive SSBs are grouped based at least in part on a directional proximity of corresponding beams for the multiple non-consecutive SSBs.

15. The method of claim 12, wherein the SS burst set is associated with at least two different types of LBT procedures for the multiple non-consecutive SSBs based at least in part on a maximum channel occupancy time (COT) associated with the SS burst set.

16. The method of claim 15, wherein the at least two different types of LBT procedures for the multiple non-consecutive SSBs include a category 4 LBT procedure based at least in part on the maximum COT being shorter than a length of the SS burst set.

17. The method of claim 15, wherein the at least two different types of LBT procedures for the multiple non-consecutive SSBs include a category 2 LBT procedure based at least in part on the maximum COT being greater than or equal to a length of the SS burst set.

18. The method of claim 1, further comprising:
dropping another set of SSBs based at least in part on a failed result of the LBT procedure.

19. The method of claim 1, wherein the LBT procedure is based at least in part on a periodicity of the SS burst set.

20. A first wireless node, comprising:
a memory; and
one or more processors coupled to the memory, the memory and the one or more processors configured to:
perform a listen-before-talk (LBT) procedure with a directional coverage that is based at least in part on a directional coverage of a set of synchronization signal and physical broadcast channel (PBCH) blocks (SSBs) of a synchronization signal (SS) burst set to be transmitted by the first wireless node,
wherein a length of a contention window associated with the LBT procedure is based at least in part on a quantity of SSBs included in the set of SSBs; and
transmit, to one or more second wireless nodes, the set of SSBs based at least in part on a successful result of the LBT procedure.

21. The first wireless node of claim 20, wherein the directional coverage of the LBT procedure matches the directional coverage of SSBs of the set of SSBs.

22. The first wireless node of claim 20, wherein the set of SSBs includes multiple SSBs of the SS burst set, wherein the multiple SSBs occupy consecutive sets of symbols of the SS burst set.

23. The first wireless node of claim 22, wherein a category of the LBT procedure for the multiple SSBs is based at least in part on a maximum channel occupancy time (COT) associated with the SS burst set.

24. The first wireless node of claim 23, wherein the LBT procedure is a category 4 LBT procedure based at least in part on the maximum COT being shorter than a length of the SS burst set.

25. The first wireless node of claim 23, wherein the LBT procedure is a category 2 LBT procedure based at least in part the maximum COT being greater than or equal to a length of the SS burst set.

26. The first wireless node of claim 20, wherein the LBT procedure is a single LBT procedure and the set of SSBs includes a total set of SSBs of the SS burst set.

27. The first wireless node of claim 20, wherein the directional coverage of the LBT procedure for the set of SSBs is a pseudo-omni-directional coverage that matches a directional coverage of the of the SS burst set.

28. The first wireless node of claim 20, wherein the LBT procedure is a category 4 LBT procedure based at least in part on the set of SSBs comprising the SS burst set.

29. The first wireless node of claim 20, wherein a subset of the set of SSBs is transmitted based at least in part on a timing of the successful result of the LBT procedure.

30. A non-transitory computer-readable medium storing one or more instructions for wireless communication, the one or more instructions comprising:

one or more instructions that, when executed by one or more processors of a first wireless node, cause the first wireless node to:
  perform a listen-before-talk (LBT) procedure with a directional coverage that is based at least in part on a directional coverage of a set of synchronization signal and physical broadcast channel (PBCH) blocks (SSBs) of a synchronization signal (SS) burst set to be transmitted by the first wireless node, wherein a length of a contention window associated with the LBT procedure is based at least in part on a quantity of SSBs included in the set of SSBs; and
  transmit, to one or more second wireless nodes, the set of SSBs based at least in part on a successful result of the LBT procedure.

* * * * *